US012478671B2

(12) United States Patent
Satoskar et al.

(10) Patent No.: US 12,478,671 B2
(45) Date of Patent: Nov. 25, 2025

(54) STEROLS AS NOVEL IMMUNOMODULATORY AGENTS AND THEIR USE AS VACCINE ADJUVANTS

(71) Applicant: Ohio State Innovation Foundation, Columbus, OH (US)

(72) Inventors: Abhay R. Satoskar, Upper Arlington, OH (US); James R. Fuchs, Columbus, OH (US); Alan Douglas Kinghorn, Columbus, OH (US); Li Pan, Rockton, IL (US); Eric Bachelder, Dublin, OH (US); Narasimham L. Parinandi, Upper Arlington, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 549 days.

(21) Appl. No.: 16/641,417

(22) PCT Filed: Aug. 24, 2018

(86) PCT No.: PCT/US2018/047967
§ 371 (c)(1),
(2) Date: Feb. 24, 2020

(87) PCT Pub. No.: WO2019/040879
PCT Pub. Date: Feb. 28, 2019

(65) Prior Publication Data
US 2020/0197514 A1   Jun. 25, 2020

Related U.S. Application Data

(60) Provisional application No. 62/549,600, filed on Aug. 24, 2017.

(51) Int. Cl.
| *A61K 39/39* | (2006.01) |
| *A61K 31/575* | (2006.01) |
| *A61K 39/008* | (2006.01) |
| *A61K 45/06* | (2006.01) |
| *A61K 39/00* | (2006.01) |

(52) U.S. Cl.
CPC ............ *A61K 39/39* (2013.01); *A61K 31/575* (2013.01); *A61K 39/008* (2013.01); *A61K 45/06* (2013.01); *A61K 2039/55511* (2013.01)

(58) Field of Classification Search
CPC .... A61K 39/008; A61K 39/39; A61K 31/575; A61K 45/06; A61K 2039/55511
See application file for complete search history.

(56) References Cited

U.S. PATENT DOCUMENTS 6,015,576 A   1/2000   See et al.

FOREIGN PATENT DOCUMENTS

WO   WO201113013   *   9/2011
WO   2016/029888 A1   3/2016

OTHER PUBLICATIONS

Northrup et al., Combining antigen and immunomodulators: Emerging trends in antigen-specific immunotherapy for autoimmunity. Advanced Drug Deliver Reviews, vol. 98 pp. 86-98 (Year: 2016).*
Akram, M., et al. "Review on medicinal uses, pharmacological, phytochemistry and immunomodulatory activity of plants." International Journal of Immunopathology and Pharmacology (2014): 313-319.
Alexander, James, Abhay R. Satoskar, and David G. Russell. "*Leishmania* species: models of intracellular parasitism." Journal of cell science 112.18 (1999): 2993-3002.
Ashford, David A., et al. "Studies on control of visceral leishmaniasis: impact of dog control on canine and human visceral leishmaniasis in Jacobina, Bahia, Brazil." The American journal of tropical medicine and hygiene 59.1 (1998): 53-57.
Aslan, Hamide, et al. "A new model of progressive visceral leishmaniasis in hamsters by natural transmission via bites of vector sand flies." The Journal of infectious diseases 207.8 (2013): 1328-1338.
Chan-Bacab, Manuel Jesús, et al. "Variation of leishmanicidal activity in four populations of Urechites andrieuxii." Journal of ethnopharmacology 86.2-3 (2003): 243-247.
Chung, Ji Won, et al. "Anti-inflammatory effects of (Z)-ligustilide through suppression of mitogen-activated protein kinases and nuclear factor-κB activation pathways." Archives of pharmacal research 35.4 (2012): 723-732.
Coler, Rhea N., et al. "From mouse to man: safety, immunogenicity and efficacy of a candidate leishmaniasis vaccine LEISH-F3+ GLA-SE." Clinical & translational immunology 4.4 (2015): e35.
De Becker, Geneviève, et al. "The adjuvant monophosphoryl lipid A increases the function of antigen-presenting cells." International immunology 12.6 (2000): 807-815.
Dey, Ranadhir, et al. "Characterization of cross-protection by genetically modified live-attenuated Leishmania donovani parasites against Leishmania mexicana." The Journal of Immunology 193.7 (2014): 3513-3527.
Duprey, Zandra H., et al. "Canine visceral leishmaniasis, United States and Canada, 2000-2003." Emerging infectious diseases 12.3 (2006): 440.
Eddlestone, Susan M. "Visceral leishmaniasis in a dog from Maryland." Journal of the American Veterinary Medical Association 217.11 (2000): 1686-1688.
Elhaik Goldman, Shirin, et al. "*Streptococcus pneumoniae* fructose-1, 6-bisphosphate aldolase, a protein vaccine candidate, elicits Th1/Th2/Th17-type cytokine responses in mice." International journal of molecular medicine 37.4 (2016): 1127-1138.

(Continued)

*Primary Examiner* — Amy L Clark
(74) *Attorney, Agent, or Firm* — Meunier Carlin & Curfman LLC

(57) ABSTRACT

Disclosed herein are methods of using immunomodulatory sterols as vaccine adjuvants. Accordingly, certain embodiments relates to pharmaceutical compositions containing at least one antigen and at least one immunomodulatory sterol; and, methods of inducing an immunomodulatory response in a patient by administering an immunomodulatory-effective amount of at least one immunomodulatory sterol.

16 Claims, 13 Drawing Sheets

(56) References Cited

OTHER PUBLICATIONS

Fiuza, Jacqueline Araújo, et al. "Induction of immunogenicity by live attenuated Leishmania donovani centrin deleted parasites in dogs." Vaccine 31.14 (2013): 1785-1792.

Fiuza, Jacqueline Araújo, et al. "Intradermal immunization of Leishmania donovani centrin knock-out parasites in combination with salivary protein LJM19 from sand fly vector induces a durable protective immune response in hamsters." PLoS neglected tropical diseases 10.1 (2016): e0004322.

Fiuza, Jacqueline Araújo, et al. "Vaccination using live attenuated Leishmania donovani centrin deleted parasites induces protection in dogs against Leishmania infantum." Vaccine 33.2 (2015): 280-288.

Glück, Reinhard. "Immunopotentiating reconstituted influenza virosomes (IRIVs) and other adjuvants for improved presentation of small antigens." Vaccine 10.13 (1992): 915-919.

Guermonprez, Pierre, et al. "Antigen presentation and T cell stimulation by dendritic cells." Annual review of immunology 20.1 (2002): 621-667.

Gupta, Gaurav, et al. "A novel sterol isolated from a plant used by Mayan traditional healers is effective in treatment of visceral leishmaniasis caused by Leishmania donovani." ACS infectious diseases 1.10 (2015): 497-506.

Handman, Emanuela. "Leishmaniasis: current status of vaccine development." Clinical microbiology reviews 14.2 (2001): 229-243.

Hina, Y., et al., "Immunomodulators From Plant Source: A Review", J. World J. Pharm. Pharm. Sci. 2015, 4, 21-36.

Ismaili, Jamila, et al. "Monophosphoryl lipid A activates both human dendritic cells and T cells." The Journal of immunology 168.2 (2002): 926-932.

Jantan, Ibrahim, Waqas Ahmad, and Syed Nasir Abbas Bukhari. "Plant-derived immunomodulators: an insight on their preclinical evaluation and clinical trials." Frontiers in plant science 6 (2015): 655.

Khamesipour, Ali, et al. "Leishmanization: use of an old method for evaluation of candidate vaccines against leishmaniasis." Vaccine 23.28 (2005): 3642-3648.

Khan, Nargis, et al. "Manipulation of costimulatory molecules by intracellular pathogens: veni, vidi, vici!!" PLoS Pathog 8.6 (2012): e1002676.

Kumar, Rajiv, et al. "Evaluation of ex vivo human immune response against candidate antigens for a visceral leishmaniasis vaccine." The American journal of tropical medicine and hygiene 82.5 (2010): 808-813.

Lawrence, Toby. "The nuclear factor NF-κB pathway in inflammation." Cold Spring Harbor perspectives in biology 1.6 (2009): a001651.

Lezama-Davila, C. M.; Isaac-Marquez, A. P.; Zamora-Crescencio, P.; Uc-Encalada Mdel, R.; Justiniano-Apolinar, S. Y.; del Angel-Robles, L.; Satoskar, A.; Hernandez-Rivero, L. Fitoterapia 2007, 78, 255-2577.

Lezama-Dávila, Claudio M., et al. "Pentalinon andrieuxii root extract is effective in the topical treatment of cutaneous leishmaniasis caused by Leishmania mexicana." Phytotherapy Research 28.6 (2014): 909-916.

Macrophage Polarization Mini Review in 2015. www.bio-rad-antibodies.com.

Manish, Manish, et al. "A single-dose PLGA encapsulated protective antigen domain 4 nanoformulation protects mice against Bacillus anthracis spore challenge." PloS one 8.4 (2013): e61885.

Martinez, Fernando O., and Siamon Gordon. "The M1 and M2 paradigm of macrophage activation: time for reassessment." F1000prime reports 6 (2014).

Martinez, Fernando Oneissi, et al. "Macrophage activation and polarization." Frontiers in bioscience: a journal and virtual library 13 (2008): 453.

Mcgwire, B. Satoskar, and A. R. Satoskar. "Leishmaniasis: clinical syndromes and treatment." QJM: An International Journal of Medicine 107.1 (2014): 7-14.

Mosser, David M., and Justin P. Edwards. "Exploring the full spectrum of macrophage activation." Nature reviews immunology 8.12 (2008): 958-969.

Natarajan, Gayathri, et al. "Ibrutinib enhances IL-17 response by modulating the function of bone marrow derived dendritic cells." Oncoimmunology 5.1 (2016): e1057385.

Nylén, Susanne, and David Sacks. "Interleukin-10 and the pathogenesis of human visceral leishmaniasis." Trends in immunology 28.9 (2007): 378-384.

Pan, Li, et al. "Sterols with antileishmanial activity isolated from the roots of Pentalinon andrieuxii." Phytochemistry 82 (2012): 128-135.

Patwardhan B, Kalbag D, Patki PS, Nagsampagi BA (1990). Search of immunomodulatory agents: A review. Indian Drugs 28(2): 56-63.

Raes, Geert, et al. "Arginase-1 and Ym1 are markers for murine, but not human, alternatively activated myeloid cells." The Journal of immunology 174.11 (2005): 6561-6562.

Rosypal, Alexa C., et al. "Emergence of zoonotic canine leishmaniasis in the United States: Isolation and immunohistochemical detection of Leishmania infantum from foxhounds from Virginia." Journal of Eukaryotic Microbiology 50 (2003): 691-693.

Röszer, Tamás. "Understanding the mysterious M2 macrophage through activation markers and effector mechanisms." Mediators of inflammation 2015 (2015), 816460.

Satoskar, Abhay, Horst Bluethmann, and James Alexander. "Disruption of the murine interleukin-4 gene inhibits disease progression during Leishmania mexicana infection but does not increase control of Leishmania donovani infection." Infection and immunity 63.12 (1995): 4894-4899.

Schneider, Laura P., et al. "Intradermally administered TLR4 agonist GLA-SE enhances the capacity of human skin DCs to activate T cells and promotes emigration of Langerhans cells." Vaccine 30.28 (2012): 4216-4224.

Schülke, Stefan, et al. "A fusion protein consisting of the vaccine adjuvant monophosphoryl lipid A and the allergen ovalbumin boosts allergen-specific Th1, Th2, and Th17 responses in vitro." Journal of immunology research 2016 (2016), 4156456.

Selvapandiyan, A.; Dey, R.; Nylen, S.; Duncan, R.; Sacks, D.; Nakhasi, H. L., Selvapandiyan, Angamuthu, et al. "Intracellular replication-deficient Leishmania donovani induces long lasting protective immunity against visceral leishmaniasis." The Journal of Immunology 183.3 (2009): 1813-1820.

Selvapandiyan, Angamuthu, et al. "A Leishmania minicircle DNA footprint assay for sensitive detection and rapid speciation of clinical isolates." Transfusion 48.9 (2008): 1787-1798.

Senekji, Harry A. "Hematologic and immunologic studies on natural and induced leishmaniasis in paretics." The American journal of tropical medicine and hygiene 1.1 (1943): 53-58.

Shin, Hye Young, et al. "Immune stimulatory effects of Loranthi ramulus on macrophages through the increase of NO and TNF-α." Immunopharmacology and immunotoxicology 31.3 (2009): 370-376.

Shukla, Shruti, Vivek K. Bajpai, and Myunghee Kim. "Plants as potential sources of natural immunomodulators." Reviews in Environmental Science and Bio/Technology 13.1 (2014): 17-33.

Singh, Damini, et al. "PLGA (85: 15) nanoparticle based delivery of rL7/L12 ribosomal protein in mice protects against Brucella abortus 544 infection: A promising alternate to traditional adjuvants." Molecular immunology 68.2 (2015): 272-279.

Singh, Om Prakash, et al. "Reassessment of immune correlates in human visceral leishmaniasis as defined by cytokine release in whole blood." Clinical and Vaccine Immunology 19.6 (2012): 961-966.

Song, Xiaoming, and Songhua Hu. "Adjuvant activities of saponins from traditional Chinese medicinal herbs." Vaccine 27.36 (2009): 4883-4890.

Surh, Young-Joon, et al. "Molecular mechanisms underlying chemopreventive activities of anti-inflammatory phytochemicals: down-regulation of COX-2 and iNOS through suppression of NF-κB activation." Mutation Research/Fundamental and Molecular Mechanisms of Mutagenesis 480 (2001): 243-268.

Tafaghodi, Mohsen, et al. "Immunization against cutaneous leishmaniasis by alginate microspheres loaded with autoclaved

(56) References Cited

OTHER PUBLICATIONS

Leishmania major (alm) and quillaja saponins." Iranian journal of pharmaceutical research: IJPR 15.2 (2016): 573.

Tafuri, Wagner L., et al. "Canine visceral leishmaniosis: a remarkable histopathological picture of one case reported from Brazil." Veterinary parasitology 96.3 (2001): 203-212.

Tarantino, C., et al. "Leishmania infantum and Neospora caninum simultaneous skin infection in a young dog in Italy." Veterinary Parasitology 102.1-2 (2001): 77-83.

Toda, Tsuguto, and Shin Yoshino. "Enhancement of ovalbumin-specific Th1, Th2, and Th17 immune responses by amorphous silica nanoparticles." International journal of immunopathology and pharmacology 29.3 (2016): 408-420.

Travi, B. L., et al. "Canine visceral leishmaniasis: dog infectivity to sand flies from non-endemic areas." Research in veterinary science 72.1 (2002): 83-86.

Trombetta, E. Sergio, and Ira Mellman. "Cell biology of antigen processing in vitro and in vivo." Annu. Rev. Immunol. 23 (2005): 975-1028.

Vaillancourt, France, et al. "Elucidation of molecular mechanisms underlying the protective effects of thymoquinone against rheumatoid arthritis." Journal of cellular biochemistry 112.1 (2011): 107-117.

Yoshimura, Satomichi, et al. "Effective antigen presentation by dendritic cells is NF-κB dependent: coordinate regulation of MHC, co-stimulatory molecules and cytokines." International immunology 13.5 (2001): 675-683.

Zhang, Weidong, et al. "Schistosoma mansoni antigen Sm-p80: Prophylactic efficacy of a vaccine formulated in human approved plasmid vector and adjuvant (VR 1020 and alum)." Acta tropica 118.2 (2011): 142-151.

International Preliminary Report on Patentability issued for Application No. PCT/US2018/047967, dated Mar. 5, 2020.

International Search Report and Written Opinion issued by the International Searching Authority (ISA/US) in PCT Application No. PCT/US2018/047967 on Dec. 11, 2018. 12 pages.

\* cited by examiner

LYMPH NODE

SPLEEN

STEROLS AS NOVEL IMMUNOMODULATORY AGENTS AND THEIR USE AS VACCINE ADJUVANTS

CROSS-REFERENCE TO RELATED APPLICATION

This application is a national stage application filed under 35 U.S.C. § 371 of PCT/US2018/047967 filed Aug. 24, 2018, which claims the benefit of U.S. Provisional Application 62/549,600, filed Aug. 24, 2017, the contents of which are hereby incorporated by reference in its entirety.

STATEMENT REGARDING GOVERNMENT SUPPORT

This invention was made with government support under grant W81XWH-14-2-0168 awarded by the United States Army Medical Research and Materiel Command. The government has certain rights in this invention.

FIELD OF THE INVENTION

The invention is directed to the use of certain sterol compounds as immunomodulatory agents, including as vaccine adjuvants.

BACKGROUND

Vaccination is a well-established and widely-employed method for reducing the incidence of infectious disease. Vaccines against infectious, allergic, and autoimmune diseases, as well as for fertility and cancer treatments, are currently in use or development. However, many antigens, when administered alone, do not produce a sufficient immune stimulus to achieve the desired therapeutic effect. The use of adjuvants, or compounds co-administered with antigen which augment antigen-specific immune responses, have proven to be extremely beneficial for the induction of protective immunity. Adjuvants are added to the antigen in vaccine compositions to enhance the body's immune response to specific antigens of the vaccine. Due to safety concerns, however, few adjuvants have been approved for use in vaccines. Moreover, pain and inflammation at injection sites are experienced far too often in vaccination programs. The adjuvants most widely used in human vaccines are aluminum-based such as alum, a mineral salt, usually made up as $Al(OH)_3$ or $Al(PO)_4$.

There remains a need for improved adjuvants for vaccines. There remains a need for adjuvants which can be safely and effectively deployed with various antigens. There remains a need for adjuvants with reduced side effect profiles. There remains a need for new immunomodulatory agents, including new immunomodulatory agents, which can function as vaccine adjuvants.

SUMMARY

In one aspect, the invention relates to sterol compounds useful as immunomodulatory agents. In certain embodiments, the sterol compounds can be used as adjuvants in vaccination methods. Accordingly, certain embodiments relates to pharmaceutical compositions containing at least one antigen and at least one immunomodulatory sterol disclosed herein. Certain embodiments relate to methods of inducing an immunomodulatory response in a patient by administering an immunomodulatory-effective amount of at least one immunomodulatory sterol. Other embodiments relate to methods of administering at least one antigen to subject, along with at least one immunomodulatory sterol disclosed herein.

The details of one or more embodiments are set forth in the descriptions below. Other features, objects, and advantages will be apparent from the description and from the claims.

DETAILED DESCRIPTION

Figure 1:
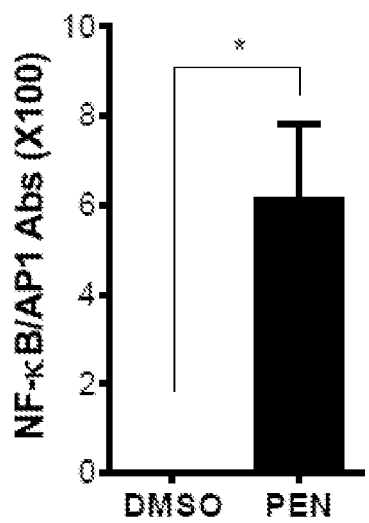
FIG. 1 depicts significantly increased alkaline phosphatase activity in RAW-Blue cells when treated with exemplary compounds compared to vehicle alone.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed are methods of vaccinating a mammal, the method including administering to the mammal at least one antigen and an immunomodulatory effective amount of an immunomodulatory sterol. In some embodiments, the antigen and immunomodulatory sterol can be administered at the same time, either in a unitary dosage form or in two separate dosage forms. In other embodiments, the immunomodulatory sterol can be administered prior to the antigen, or subsequent to the antigen. Also disclosed are pharmaceutical compositions including at least one antigen and an immunomodulatory effective amount of an immunomodulatory sterol. Further disclosed are kits including at least one antigen and an immunomodulatory effective amount of an immunomodulatory sterol. In some instances, the kit can include a unitary dosage form which includes both the antigen and immunomodulatory sterol, while in other instances the kit can include two separate dosage forms, the first containing at least one antigen, the second containing at least one immunomodulatory sterol.

In certain embodiments, the immunomodulatory sterol includes a compound having formula:

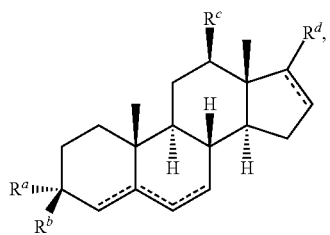

wherein each ═════ is independently a single or double bond, with the proviso that the compound does not include an allene;
wherein $R^a$ is $OR^e$ and $R^b$ is hydrogen, or $R^a$ is hydrogen and $R^b$ is is $OR^e$, or $R^a$ and $R^b$ together form a carbonyl, wherein Re is selected from hydrogen or a carbohydrate moiety, i.e., a monosaccharide, disaccharide, or trisaccharide;
$R^c$ is hydrogen, $C_1$-$C_{12}$ alkyl or $C_1$-$C_{12}$ alkenyl, or $R^a$ and $R^b$ together form a carbonyl;

$R^d$ a group having the formula X—$R^f$, wherein X is either absent or a carbonyl, and $R^f$ is $C_1$-$C_{12}$ alkyl or $C_1$-$C_{12}$ alkenyl;

or a pharmaceutically acceptable salt or prodrug thereof.

Exemplary monosaccharides, disaccharides, or trisaccharides can have the formula:

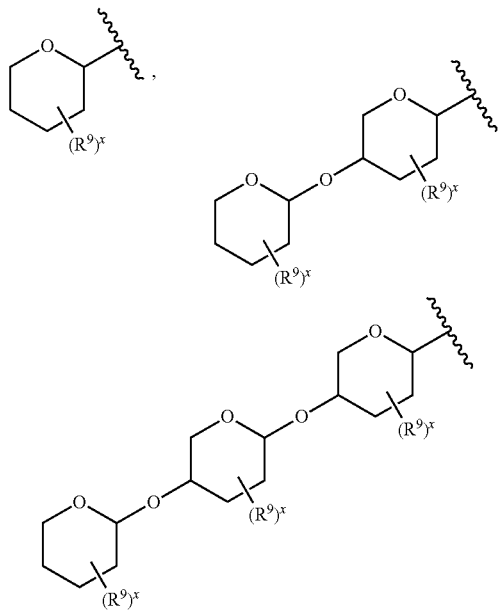

Wherein $R^g$ is in each case independently selected from hydroxyl, $C_1$-$C_8$ alkoxy, $C_1$-$C_8$ alkyl, $C_1$-$C_8$ hydroxyalkyl, $C_1$-$C_8$ alkylamine, $C_1$-$C_8$ dialkylamine, halo, carboxyl, and acetamido, and x is independently selected from 1-9.

In some embodiments, the carbohydrate includes one or more of allose, hexose, altrose, arabinose, erythrose, erythrulose, fructose, D-fucitol, L-fucitol, fucosamine, fucose, galactosamine, D-galactosaminitol, galactose, glucosamine, glucosaminitol, glucose, gulose, idose, lyxose, mannosamine, mannose, psicose, quinovose, quinovosamine, rhamnitol, rhamnosamine, rhamnose, ribose, ribulose, sorbose, tagatose, talose, threose, xylose, xylulose, abequose, amicetose, amylose, apiose, arcanose, ascarylose, boivinose, cellobiose, cellotriose, chacotriose, chalcose, cladinose, colitose, cymarose, 2-deoxyribose, 2-deoxyglucose, diginose, digitalose, digitoxose, evalose, evernitrose, gentianose, gentiobiose, hamamelose, inulin, isolevoglucosenone, isomaltose, isomaltotriose, isopanose, kojibiose, lactose, lactosamine, lactosediamine, laminarabiose, levoglucose, levoglucosenone, maltose, manninotriose, melezitose, melibiose, muramic acid, mycarose, mycinose, neuraminic acid, nigerose, nojirimycin, noviose, oleandrose, panose, paratose, planteose, primeverose, raffinose, rhodinose, rutinose, sarmentose, sedoheptulose, sedoheptulosan, solatriose, sophorose, stachyose, streptose, sucrose, α,α-trehalose, trehalosamine, turanose, tyvelose, umbelliferose, acosamine, bacillosamine, daunosamine, desosamine, forosamine, garosamine, kanosamine, kansosamine, mycaminose, mycosamine, perosamine, pneumosamine, purpurosamine C, rhodosamine, and mixtures thereof.

In certain embodiments, the immunomodulatory sterol includes a compound having formula:

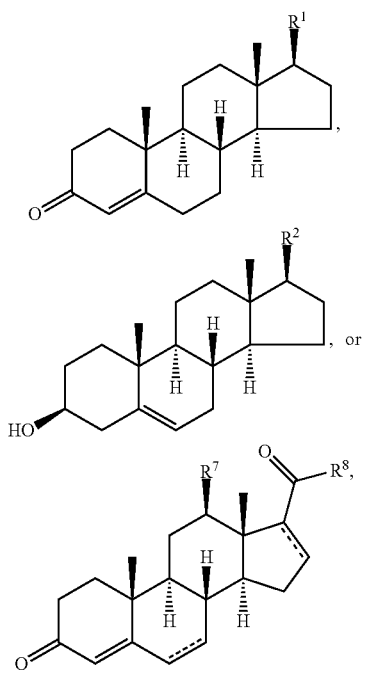

wherein each ===== is independently a single or double bond; wherein $R^1$ is selected from $C_1$-$C_{12}$ alkyl and $C_1$-$C_{12}$ alkenyl; wherein $R^2$ is selected from $C_1$-$C_{12}$ alkyl and $C_1$-$C_{12}$ alkenyl; wherein $R^7$ is selected from hydrogen, hydroxyl, amino, and halogen; and wherein $R^8$ is selected from hydrogen $C_1$-$C_{12}$ alkyl and $C_1$-$C_{12}$ alkenyl; or a pharmaceutically acceptable salt or prodrug.

The immunomodulatory sterols may be formulated as a pharmaceutically acceptable salts in embodiments in which the sterol includes at least one ionizable functional group. Ionizable functional groups include those capable of donating or receiving a proton, becoming ionically charged as a result. Ionizable functional groups include carboxylic acids and amines. Pharmaceutically acceptable salts are salts that retain the desired biological activity of the parent compound and do not impart undesirable toxicological effects. Examples of such salts are acid addition salts formed with inorganic acids, for example, hydrochloric, hydrobromic, sulfuric, phosphoric, and nitric acids and the like; salts formed with organic acids such as acetic, oxalic, tartaric, succinic, maleic, fumaric, gluconic, citric, malic, methanesulfonic, ptoluenesulfonic, napthalenesulfonic, and polygalacturonic acids, and the like; salts formed from elemental anions such as chloride, bromide, and iodide; salts formed from metal hydroxides, for example, sodium hydroxide, potassium hydroxide, calcium hydroxide, lithium hydroxide, and magnesium hydroxide; salts formed from metal carbonates, for example, sodium carbonate, potassium carbonate, calcium carbonate, and magnesium carbonate; salts formed from metal bicarbonates, for example, sodium bicarbonate and potassium bicarbonate; salts formed from metal sulfates, for example, sodium sulfate and potassium sulfate; and salts formed from metal nitrates, for example, sodium nitrate and potassium nitrate. Pharmaceutically acceptable and non-pharmaceutically acceptable salts may be prepared using procedures well known in the art, for example, by reacting a sufficiently basic compound such as an amine with a suitable acid comprising a physiologically acceptable anion. Alkali metal (for example, sodium, potassium, or lithium) or alkaline earth metal (for example, calcium) salts of carboxylic acids can also be made.

The immunomodulatory sterols may be formulated as pharmaceutically acceptable prodrugs. Prodrugs can substantially increase the bioavailability of the compounds, permitting more effective oral therapy. In certain cases, a hydroxyl group can be functionalized with a phosphonic or sulfonic acid group. In some embodiments, when the sterol contains at least one hydroxyl group, the prodrug is a $C_1$-$C_{10}$ alkyl ester formed with said hydroxyl. Exemplary esters may be formed using $C_1$-$C_{10}$ acids, for instance, propionic acid, acetic acid, caproic acid, valeric acid, enantic acid, 2-furoic acid, etc, using techniques known to those of skill in the art. In other embodiments, when the sterol contains at least one amine group, the amine may be modified to a prodrug, for instance a phosphonate, phosphamide, aminomethylenes (—$CH_2NR_2$), methylene ethers, and the like.

In some embodiments, the immunomodulatory sterol can be a compound of the formula,

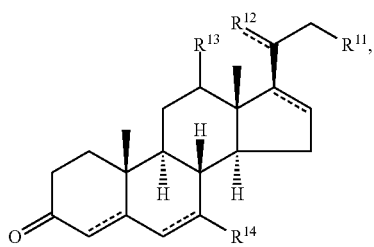

wherein each ===== is independently a single or double bond, wherein $R^{11}$ is selected from the group consisting of H, alkyl, alkenyl, aryl, and heteroaryl; wherein $R^{12}$ is selected from the group consisting of =$CH_2$, =O, and —$CH_3$; $R^{13}$ is selected from the group consisting of hydrogen, hydroxyl, amino, halogen, and keto; and wherein $R^{14}$ is selected from the group consisting of hydrogen, hydroxyl, amino, halogen, and keto; or a pharmaceutically acceptable salt thereof. In some cases, the immunomodulatory sterol is pentalinonsterol (also designated PEN), which has the formula:

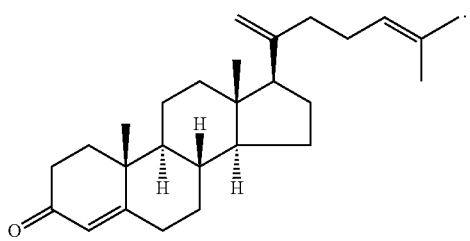

The immunomodulatory sterol may be oxygenated and/or glycosylated, for instance,

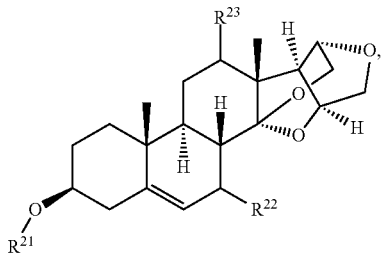

wherein $R^{21}$ is selected from the group consisting of H, alkyl, alkenyl, aryl, heteroaryl, silyl, and carbohydrate; wherein $R^{22}$ is selected from the group consisting of hydrogen, hydroxyl, and keto; and wherein $R^{23}$ is selected from the group consisting of hydrogen, hydroxyl, and keto; or a pharmaceutically acceptable salt, solvate, or polymorph thereof. In some instances, the immunomodulatory sterol can be pentalinonoside, which has the formula:

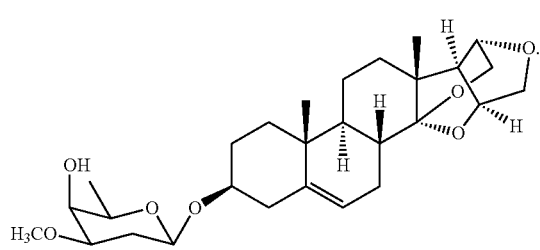

In some embodiments, the immunomodulatory sterol can be a compound of the formula:

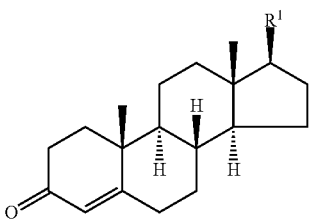

wherein $R^1$ is selected from $C_1$-$C_{12}$ alkyl and $C_1$-$C_{12}$ alkenyl; or a pharmaceutically acceptable salt, solvate, or polymorph thereof. In a further aspect, $R^1$ is $C_1$-$C_{12}$ alkyl. In a still further aspect, $R^1$ is $C_1$-$C_{12}$ alkenyl. In a yet further aspect, $R^1$ is $C_8$-$C_{12}$ alkenyl. In a yet further aspect, $R^1$ is $C_8$-$C_{11}$ alkenyl. In an even further aspect, $R^1$ is $C_8$-$C_{10}$ alkenyl. In a still further aspect, R1 is $C_8$-$C_9$ alkenyl. In a yet further aspect, $R^1$ is $C_8$ alkenyl. In an even further aspect, $R^1$ is selected from:

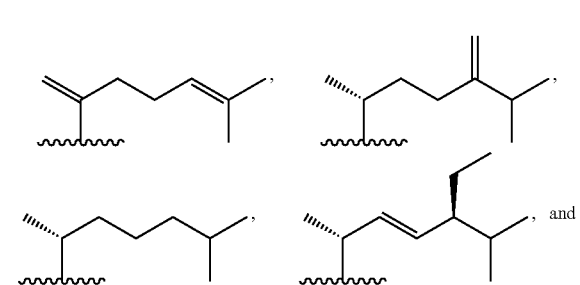

-continued

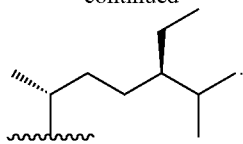

In a still further aspect, $R^1$ is selected from:

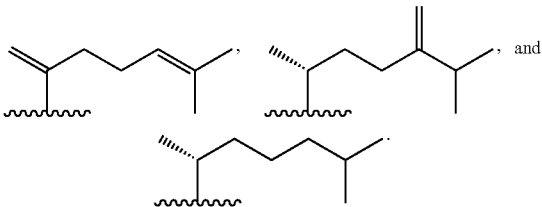

In some embodiments, the immunomodulatory sterol can be a compound of the formula:

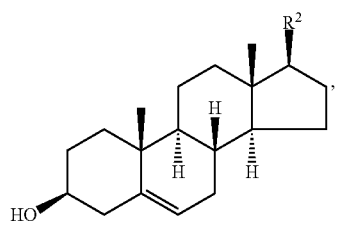

wherein $R^2$ is selected from $C_1$-$C_{12}$ alkyl and $C_1$-$C_{12}$ alkenyl; or a pharmaceutically acceptable salt, solvate, or polymorph thereof. In a further aspect, $R^2$ is $C_1$-$C_{12}$ alkyl. In a still further aspect, $R^2$ is $C_1$-$C_{12}$ alkenyl. In a yet further aspect, $R^2$ is $C_8$-$C_{12}$ alkenyl. In a yet further aspect, $R^2$ is $C_8$-$C_{11}$ alkenyl. In an even further aspect, $R^2$ is $C_8$-$C_{10}$ alkenyl. In a still further aspect, $R^2$ is $C_8$-$C_9$ alkenyl. In a yet further aspect, $R^2$ is $C_8$ alkenyl. In an even further aspect, $R^2$ is selected from:

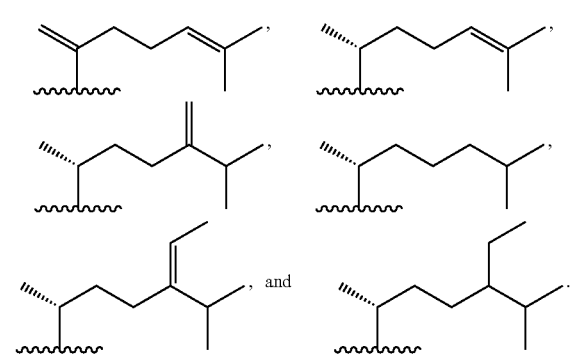

In a still further aspect, $R^2$ is:

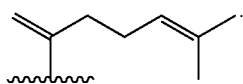 [SMILES: *C(=C)CCC=C(C)C]

In some embodiments, the immunomodulatory sterol can be a compound of the formula:

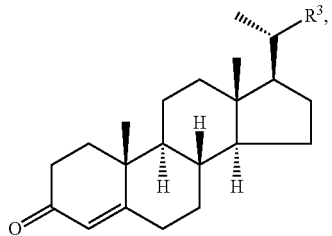

wherein $R^3$ is selected from $C_1$-$C_8$ alkyl and C1-C8 alkenyl; or a pharmaceutically acceptable salt, solvate, or polymorph thereof. In a further aspect, $R^3$ is $C_1$-$C_8$ alkyl. In a still further aspect, $R^3$ is $C_1$-$C_8$ alkenyl. In a yet further aspect, $R^3$ is $C_4$-$C_8$ alkenyl. In a yet further aspect, $R^3$ is $C_5$-$C_7$ alkenyl. In an even further aspect, $R^3$ is $C_6$ alkenyl.

In some embodiments, the immunomodulatory sterol can be a compound of the formula

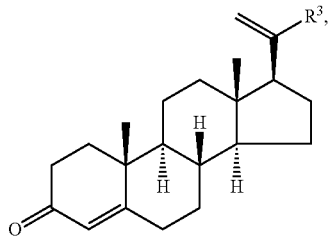

wherein $R^3$ is selected from $C_1$-$C_{12}$ alkyl and $C_1$-$C_{12}$ alkenyl; or a pharmaceutically acceptable salt, solvate, or polymorph thereof. In a further aspect, $R^3$ is $C_1$-$C_8$ alkyl. In a still further aspect, $R^3$ is $C_1$-$C_8$ alkenyl. In a yet further aspect, $R^3$ is $C_4$-$C_8$ alkenyl. In a yet further aspect, $R^3$ is $C_5$-$C_7$ alkenyl. In an even further aspect, $R^3$ is $C_6$ alkenyl.

In some embodiments, the immunomodulatory sterol can be a compound of the formula:

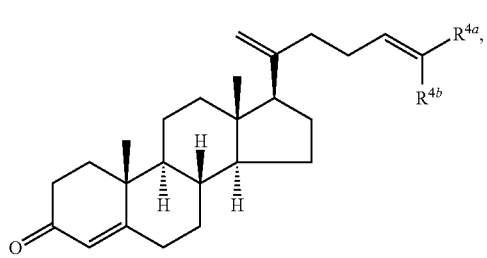

wherein each of $R^{4a}$ and $R^{4b}$ is independently selected from hydrogen and $C_1$-$C_{12}$ alkyl; or a pharmaceutically acceptable salt, solvate, or polymorph thereof. In a further aspect, each of $R^{4a}$ and $R^{4b}$ is independently selected from hydrogen, methyl, ethyl, propyl, and isopropyl. In a further aspect, each of $R^{4a}$ and $R^{4b}$ is independently selected from hydrogen, methyl, and ethyl. In a yet further aspect, each of $R^{4a}$ and $R^{4b}$ is independently selected from hydrogen and methyl.

In some embodiments, the immunomodulatory sterol can be a compound of the formula:

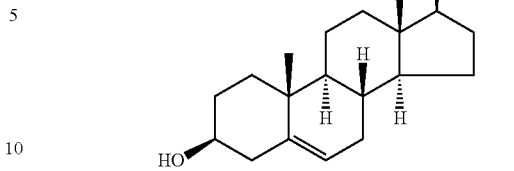

wherein $R^5$ is selected from $C_1$-$C_8$ alkyl and $C_1$-$C_8$ alkenyl; or a pharmaceutically acceptable salt, solvate, or polymorph thereof. In a further aspect, $R^5$ is $C_1$-$C_8$ alkyl. In a still further aspect, $R^5$ is $C_1$-$C_8$ alkenyl. In a yet further aspect, $R^5$ is $C_4$-$C_8$ alkenyl. In a yet further aspect, $R^5$ is $C_5$-$C_7$ alkenyl. In an even further aspect, $R^5$ is $C_6$ alkenyl.

In some embodiments, the immunomodulatory sterol can be a compound of the formula:

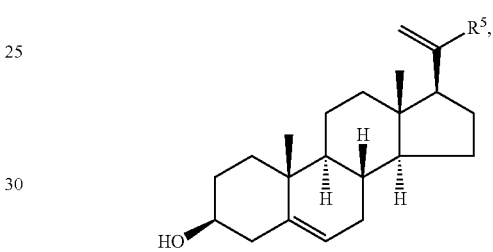

wherein $R^5$ is selected from $C_1$-$C_8$ alkyl and $C_1$-$C_8$ alkenyl; or a pharmaceutically acceptable salt, solvate, or polymorph thereof. In a further aspect, $R^5$ is $C_1$-$C_8$ alkyl. In a still further aspect, $R^5$ is $C_1$-$C_8$ alkenyl. In a yet further aspect, $R^5$ is $C_4$-$C_8$ alkenyl. In a yet further aspect, $R^5$ is $C_5$-$C_7$ alkenyl. In an even further aspect, $R^5$ is $C_6$ alkenyl.

In some embodiments, the immunomodulatory sterol can be a compound of the formula:

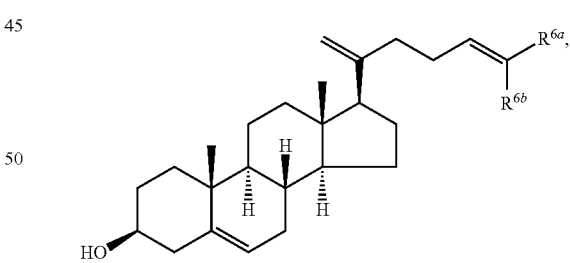

wherein each of $R^{6a}$ and $R^{6b}$ is independently selected from hydrogen and $C_1$-$C_{12}$ alkyl; or a pharmaceutically acceptable salt, solvate, or polymorph thereof. In a further aspect, each of $R^{6a}$ and $R^{6b}$ is independently selected from hydrogen, methyl, ethyl, propyl, and isopropyl. In a further aspect, each of $R^{6a}$ and $R^{6b}$ is independently selected from hydrogen, methyl, and ethyl. In a yet further aspect, each of $R^{6a}$ and $R^{6b}$ is independently selected from hydrogen and methyl.

In some embodiments, the immunomodulatory sterol can be a compound of the formula:

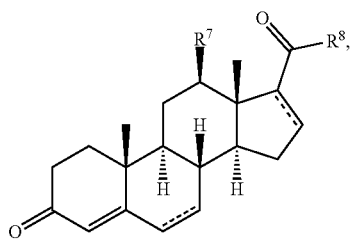

wherein each ===== is independently a single or double; wherein R⁷ is selected from hydrogen, hydroxyl, amino, and halogen; and wherein R⁸ is selected from hydrogen and $C_1$-$C_6$ alkyl; or a pharmaceutically acceptable salt, solvate, or polymorph thereof. In a still further aspect, R⁷ is hydroxyl. In a yet further aspect, R⁸ is selected from hydrogen, methyl, ethyl, propyl, and isopropyl. In an even further aspect, R⁸ is methyl. In a still further aspect, R⁷ is hydroxyl and R⁸ is methyl.

In some embodiments, the immunomodulatory sterol can be a compound of the formula:

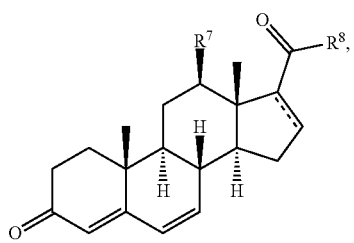

wherein ===== is independently a single or double bond; wherein R⁷ is selected from hydrogen, hydroxyl, amino, and halogen; and wherein R⁸ is selected from hydrogen and $C_1$-$C_6$ alkyl; or a pharmaceutically acceptable salt, solvate, or polymorph thereof.

In some embodiments, the immunomodulatory sterol can be a compound of the formula:

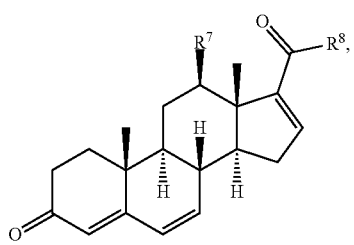

wherein R⁷ is selected from hydrogen, hydroxyl, amino, and halogen; and wherein R⁸ is selected from hydrogen and $C_1$-$C_6$ alkyl; or a pharmaceutically acceptable salt, solvate, or polymorph thereof.

In some embodiments, the immunomodulatory sterol can be a compound of the formula:

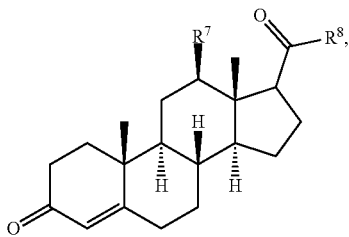

wherein R⁷ is selected from hydrogen, hydroxyl, amino, and halogen; and wherein R⁸ is selected from hydrogen and $C_1$-$C_6$ alkyl; or a pharmaceutically acceptable salt, solvate, or polymorph thereof.

In some embodiments, the immunomodulatory sterol can be a compound of the formula:

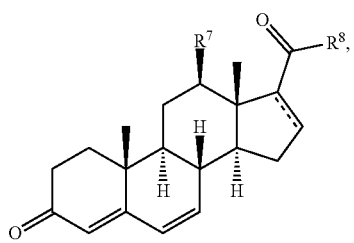

wherein R⁷ is selected from hydrogen, hydroxyl, amino, and halogen; and wherein R⁸ is selected from hydrogen and $C_1$-$C_6$ alkyl; or a pharmaceutically acceptable salt, solvate, or polymorph thereof.

The immunomodulatory sterol can include one of the following compounds:

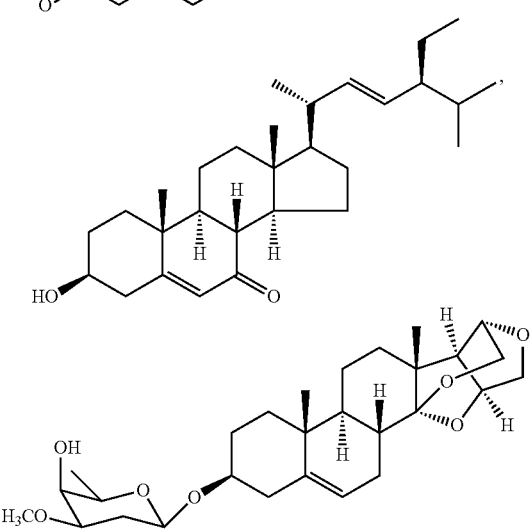

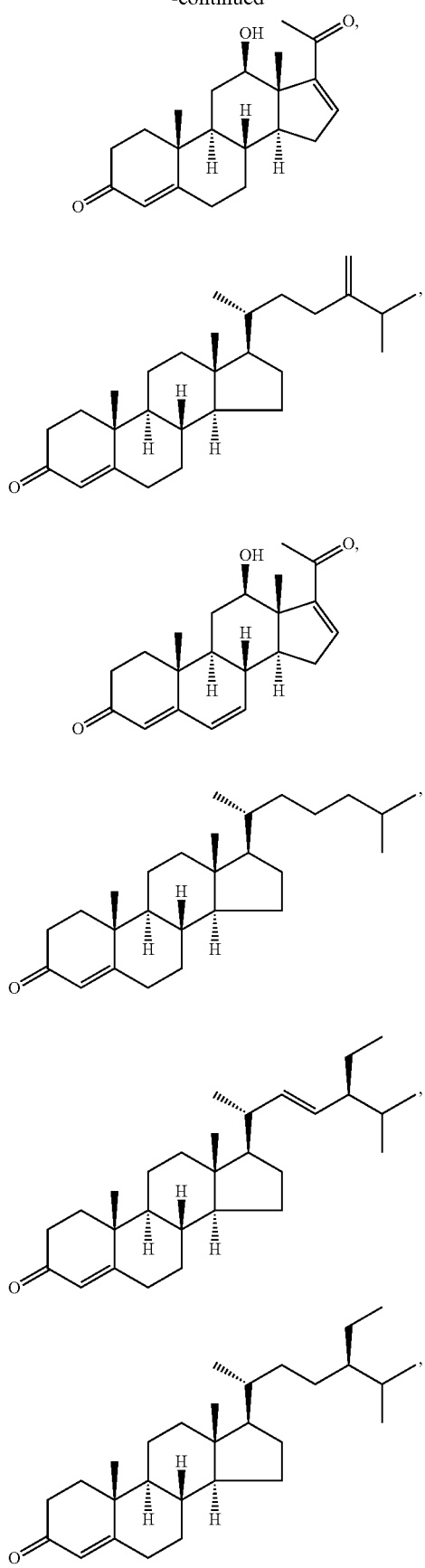

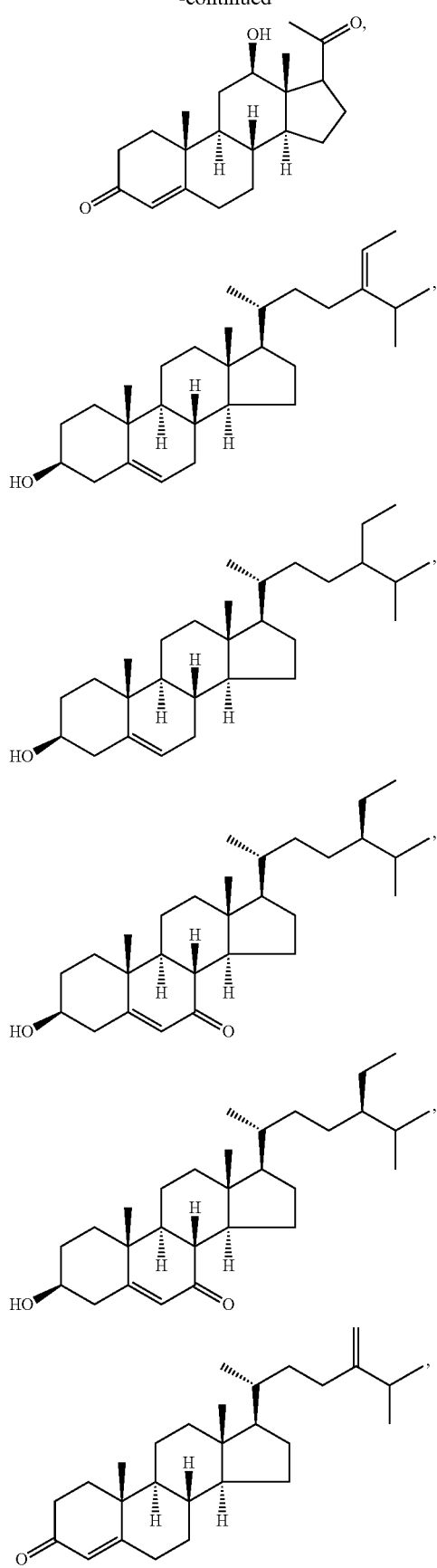
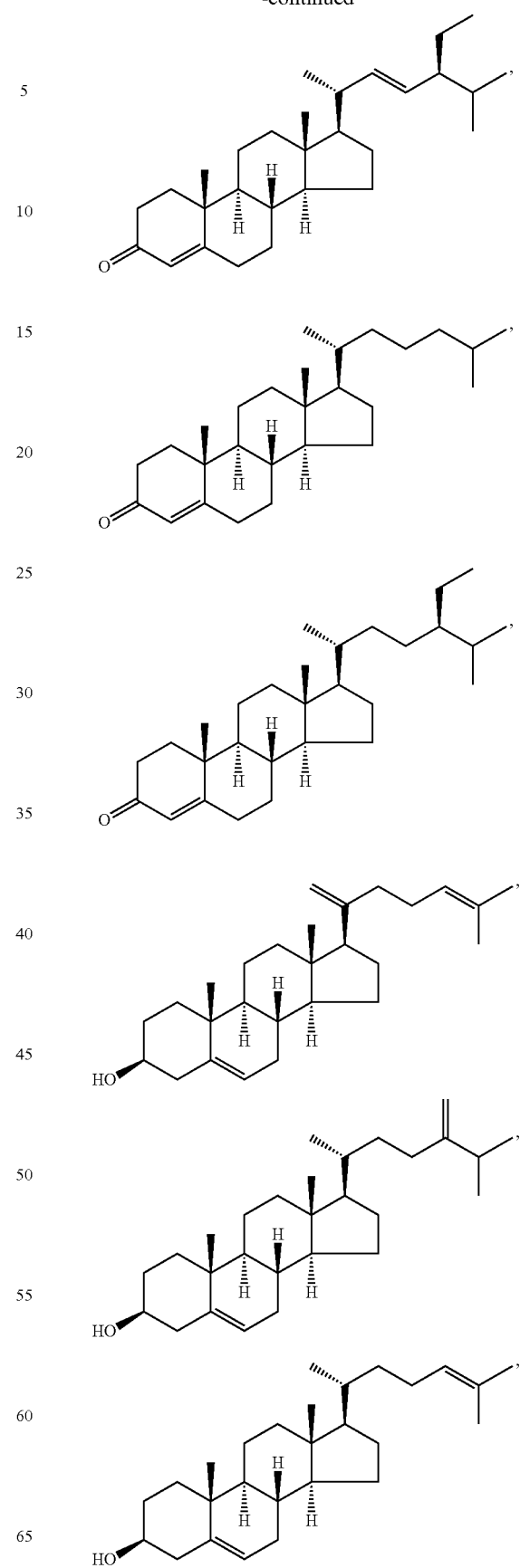

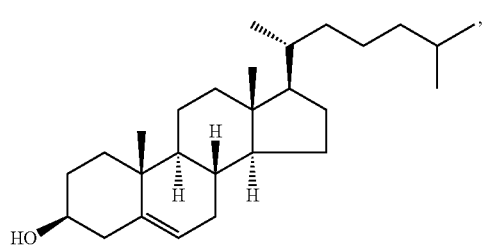
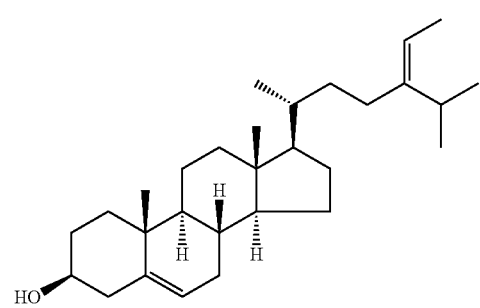
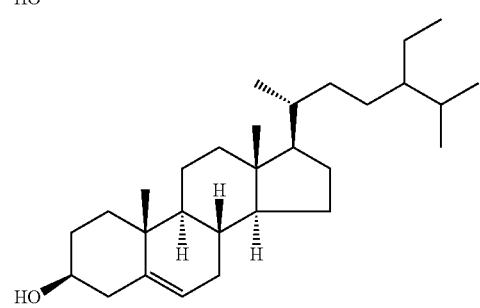
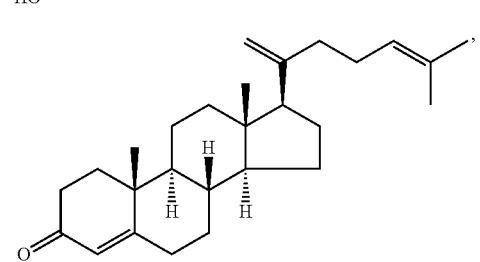
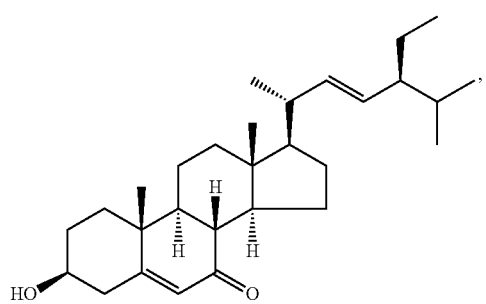
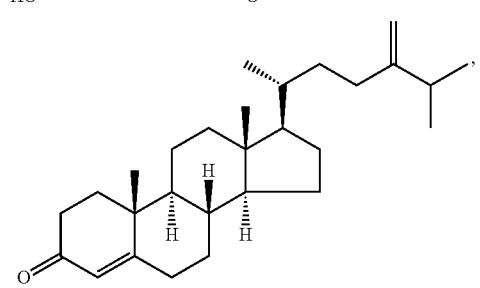
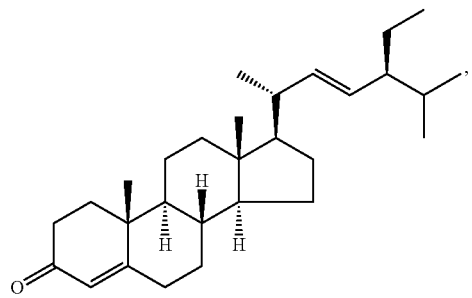
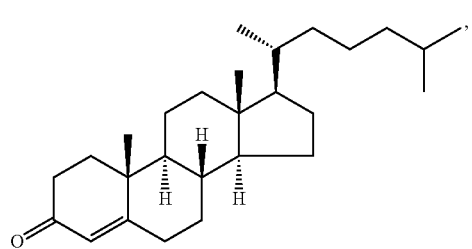
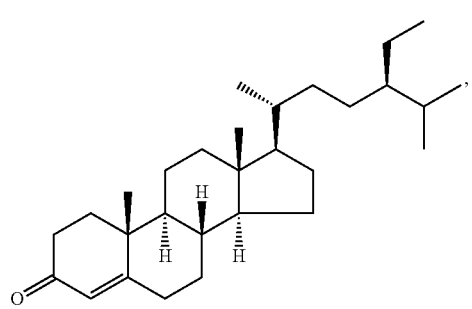
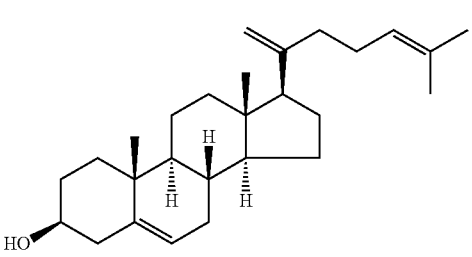
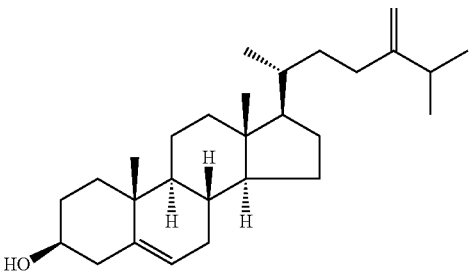
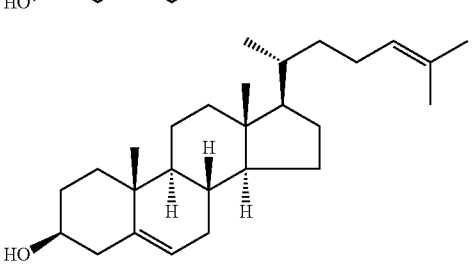

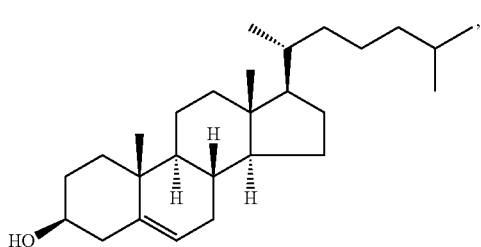
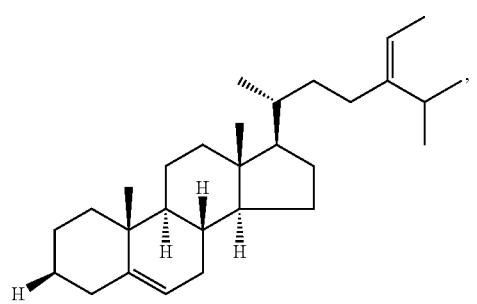
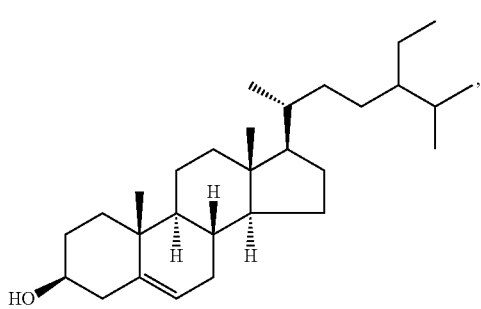
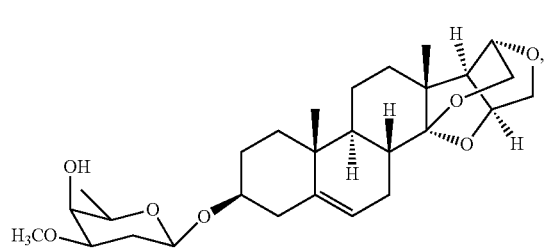
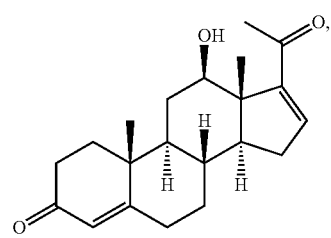
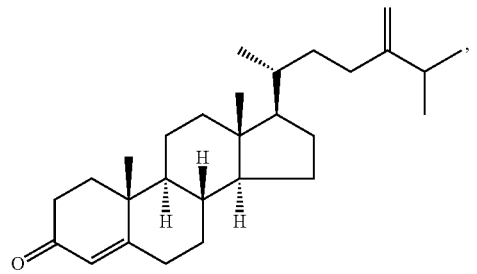
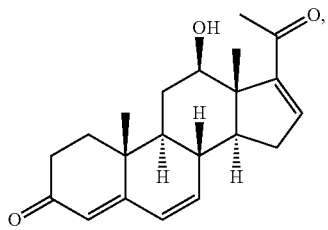
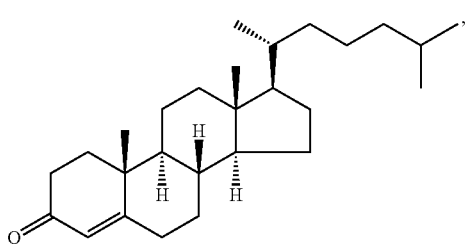
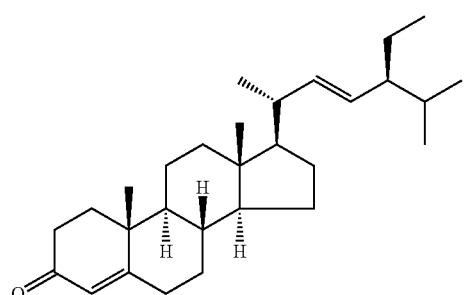
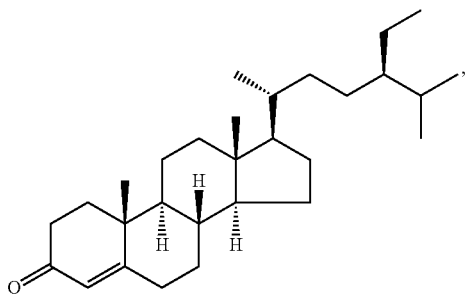
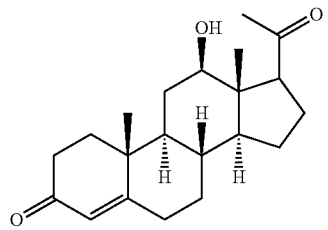
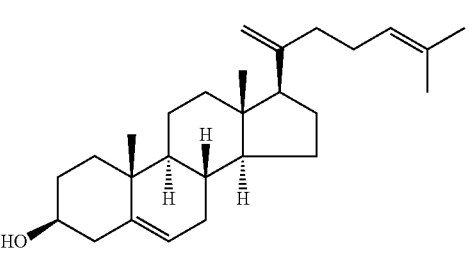

-continued
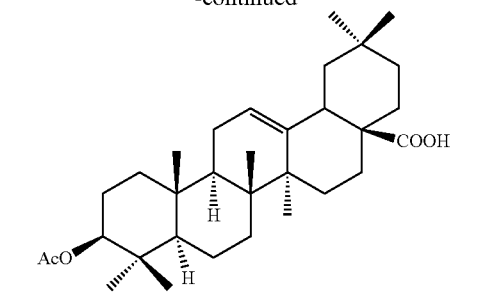
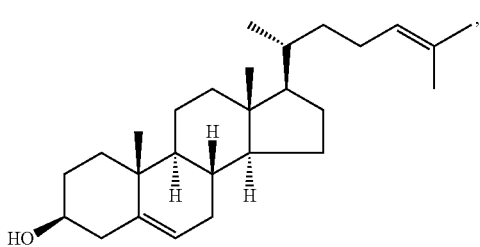
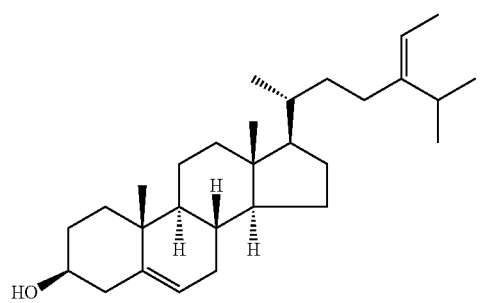
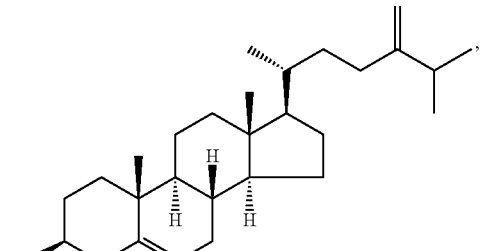
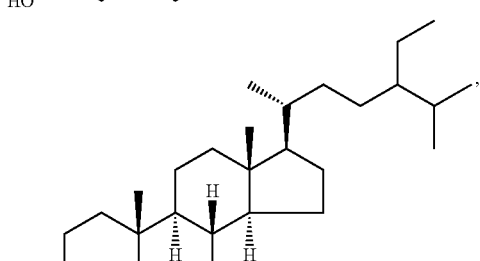
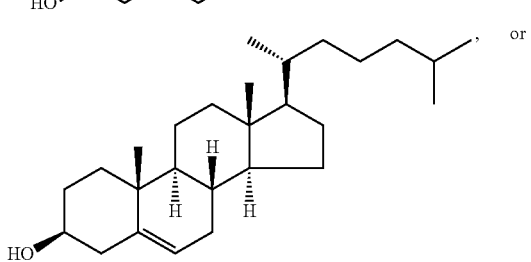, or
-continued
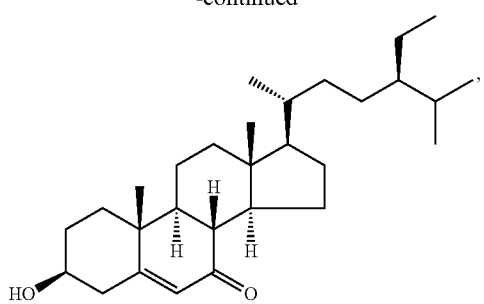
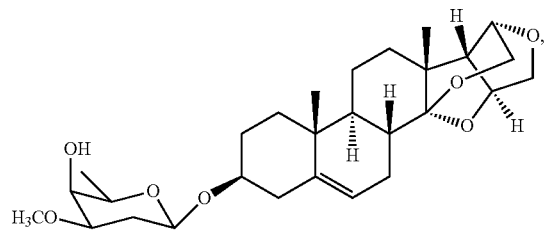
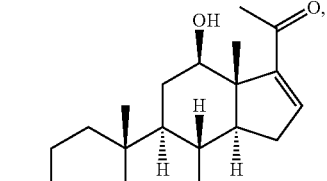
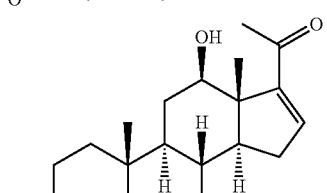
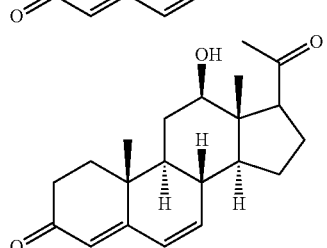
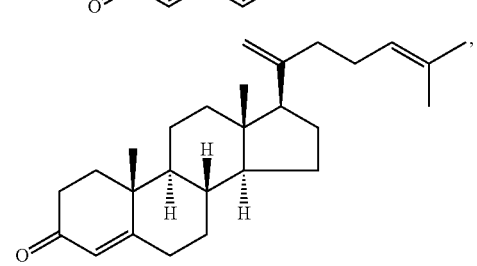
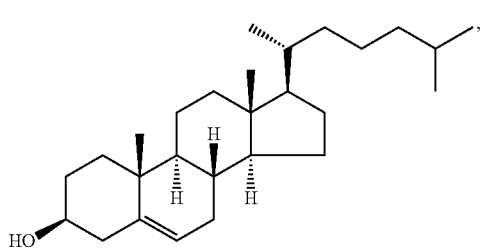

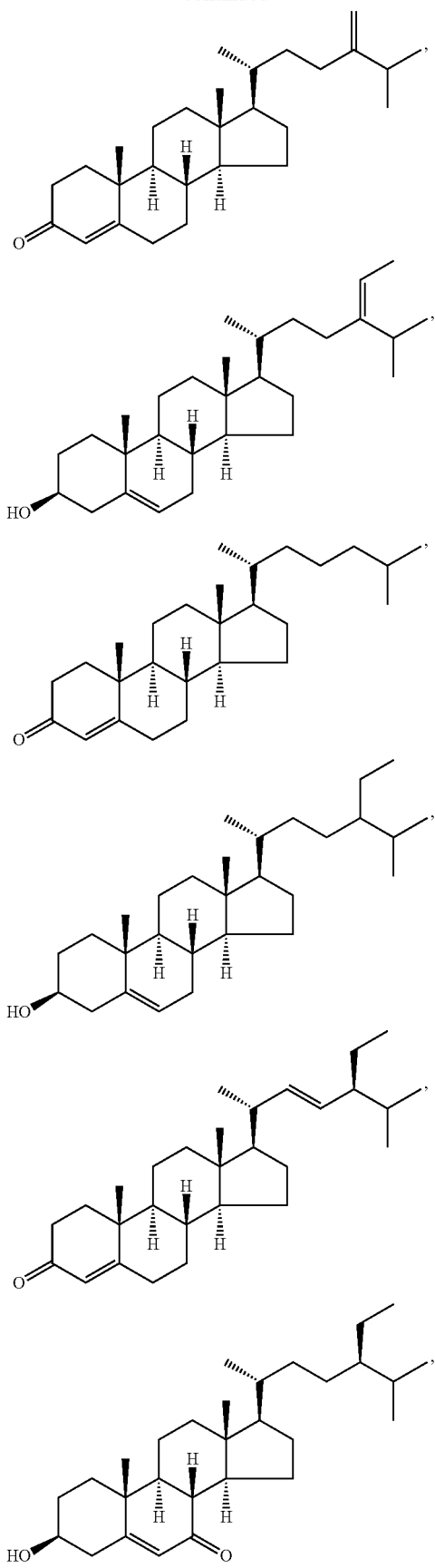
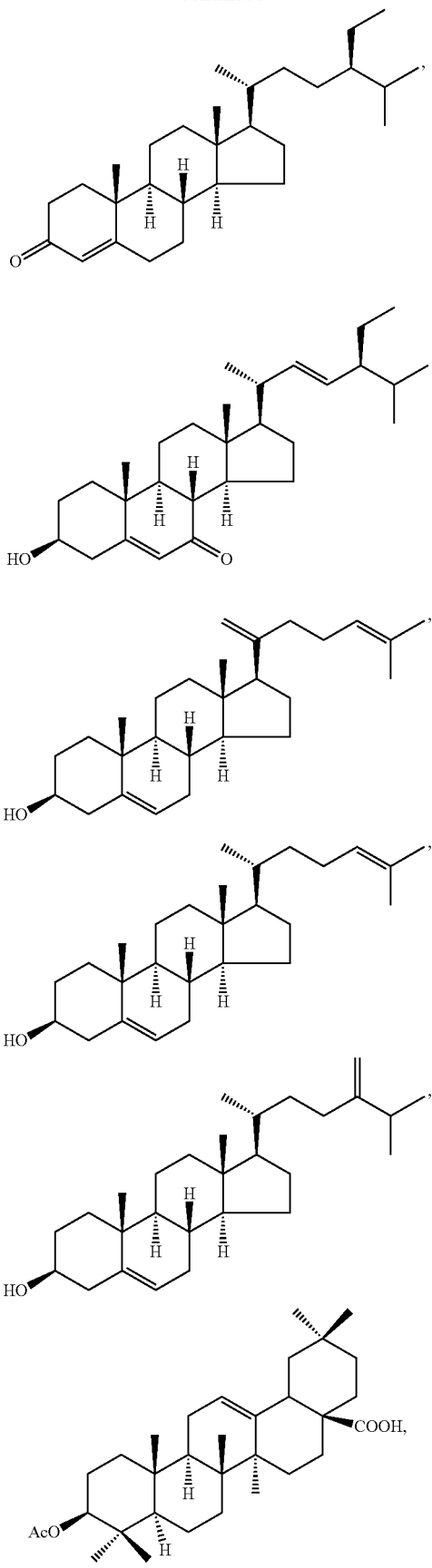

-continued
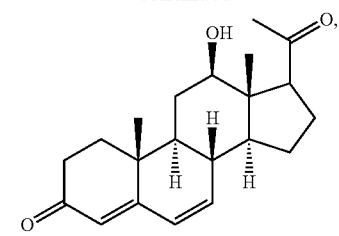
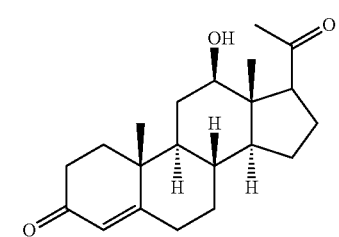
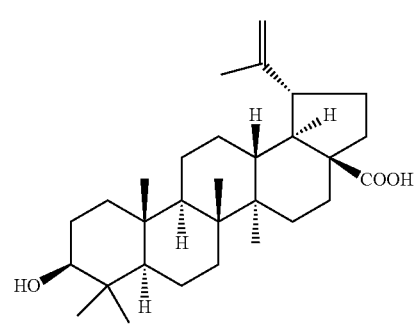
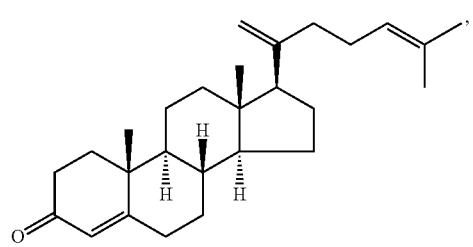
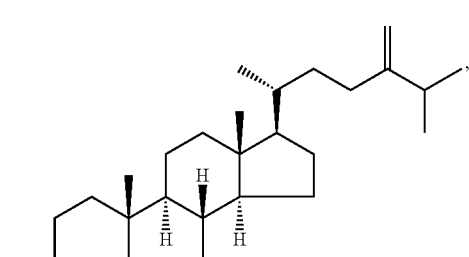
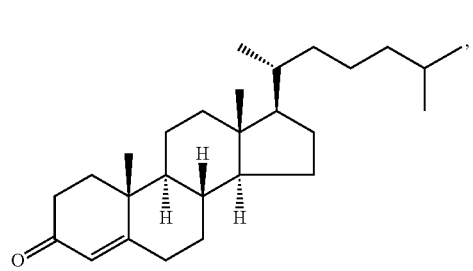
-continued
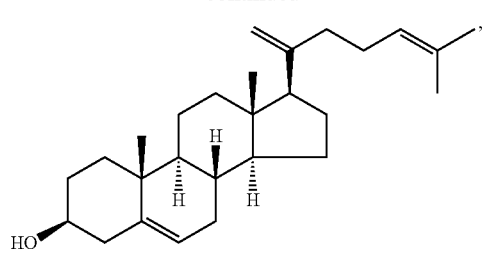
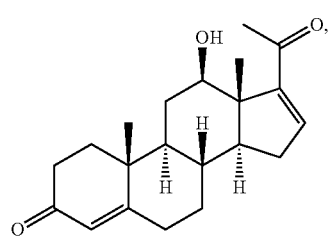
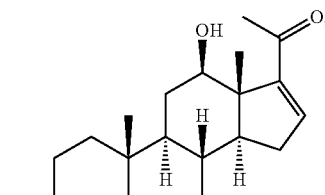
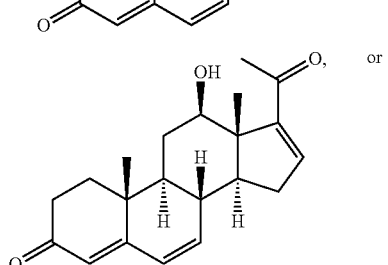 or
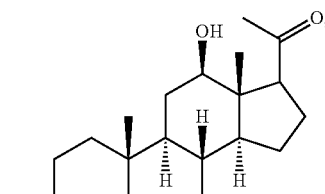
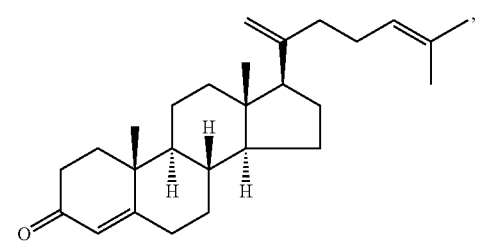
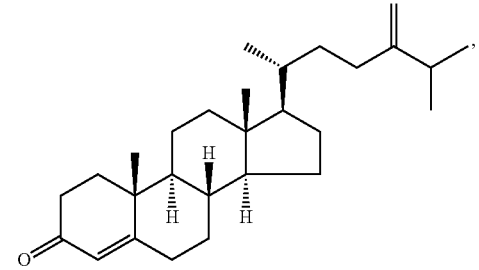

27
-continued
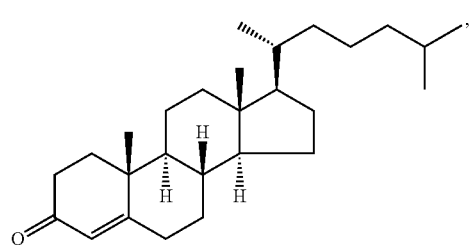
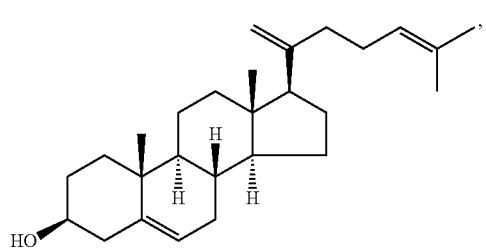
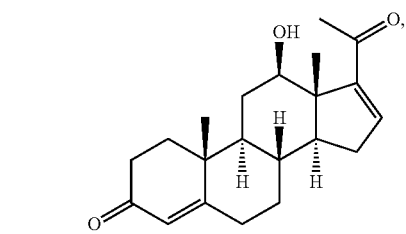
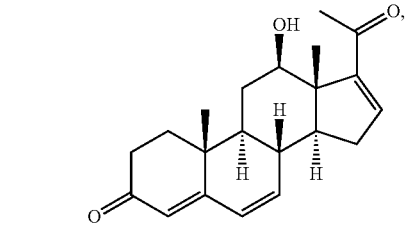
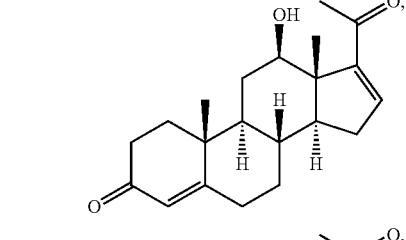
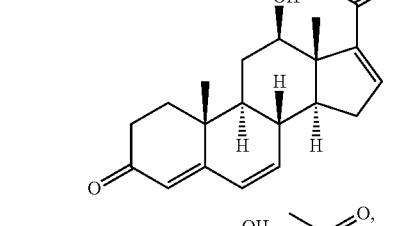
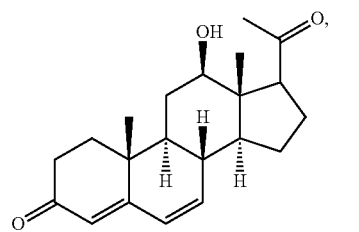, or
28
-continued
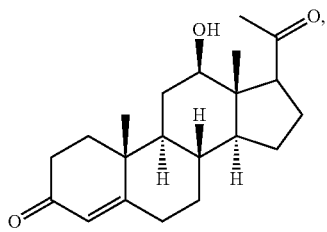
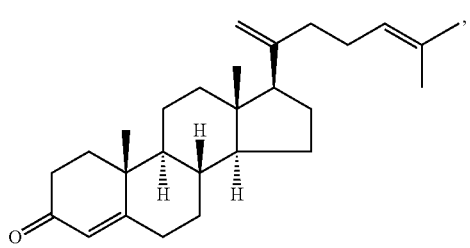
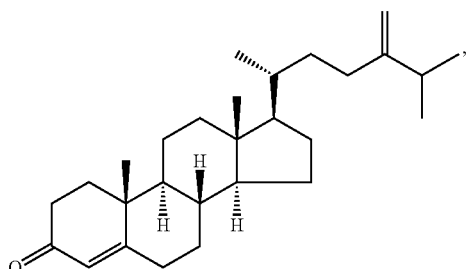
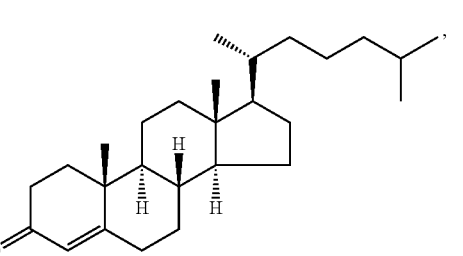, or
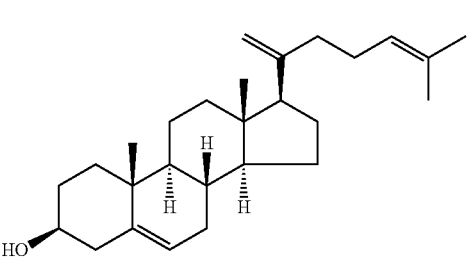
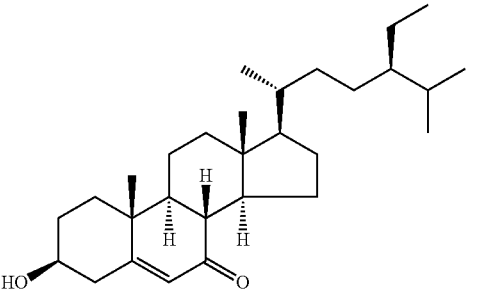 or 29
-continued
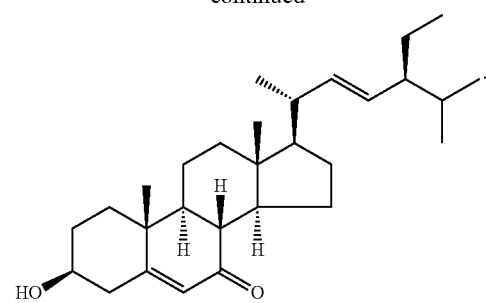
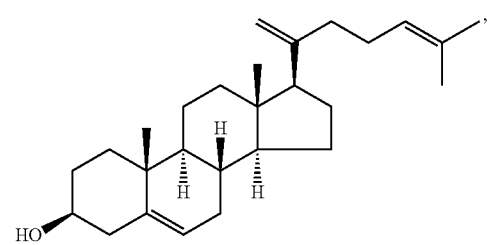
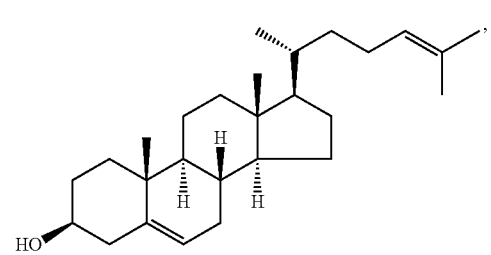
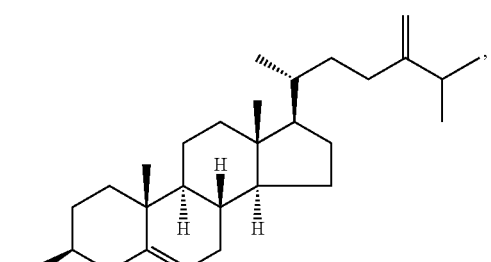
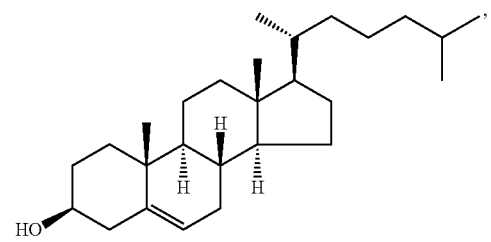
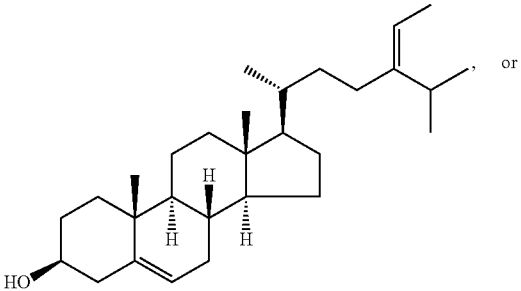
30
-continued
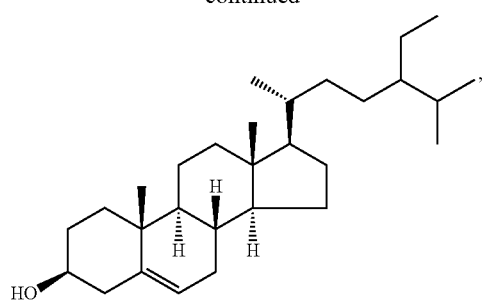
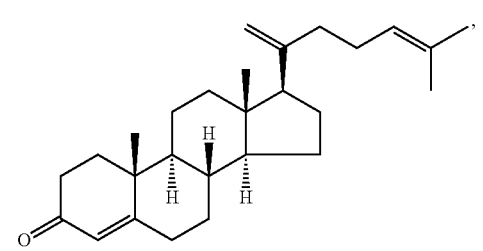
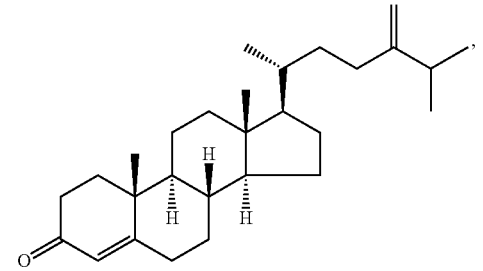
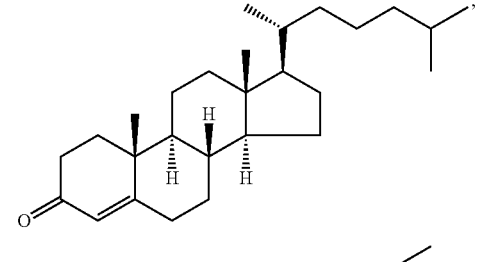
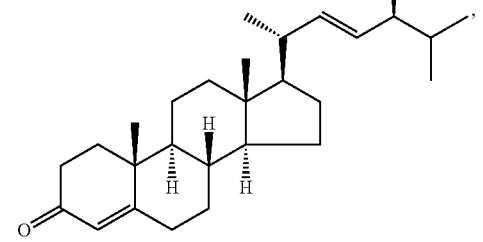
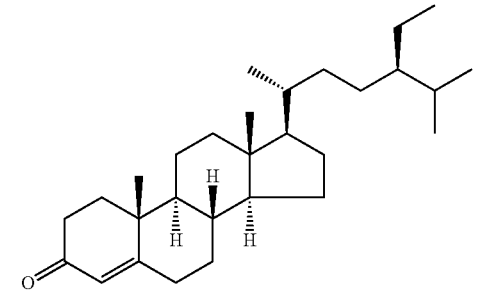

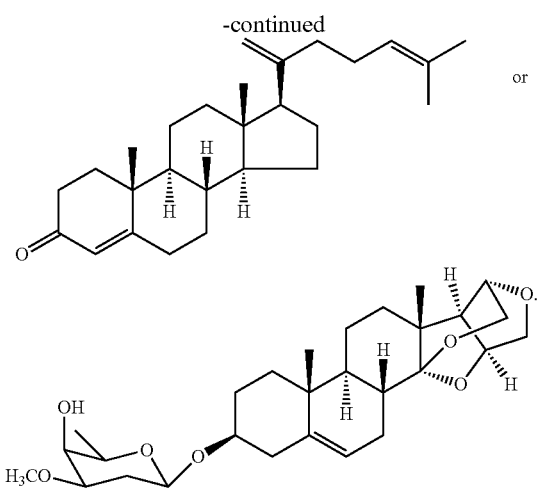

The immunomodulatory sterols can be administered in an effective amount to induce a immunomodulatory response. In some cases the immunomodulatory sterol can be administered in an amount from 0.001-1,000 μg, from 0.01-1,000 μg, from 0.1-1,000 μg, from 0.1-500 μg, from 0.1-100 μg, from 1-100 μg, from 10-100 μg, or from 25-75 μg, In some embodiments, about 0.001 μg/kg to about 100 mg/kg body weight will generally be administered, typically by the intradermal, subcutaneous, intramuscular or intravenous route, or by other routes. In a more specific embodiment, the dosage is about 0.001 μg/kg to about 1 mg/kg. In another specific embodiment, the dosage is about 0.001 to about 50 μg/kg. In another specific embodiment, the dosage is about 0.001 to about 25 μg/kg.

In another specific embodiment, the amount of immunomodulatory sterol administered is about 0.01 μg/dose to about 5 mg/dose. In another specific embodiment, the amount of immunomodulatory sterol administered is about 0.1 μg/dose to about 1 mg/dose. In another specific embodiment, the amount of immunomodulatory sterol administered is about 0.1 μg/dose to about 100 μg/dose. In another specific embodiment, the immunomodulatory sterol administered is about 0.1 μg/dose to about 10 μg/dose. In some cases, the immunomodulatory sterol administered is about 0.1-50 μg/dose, about 0.1-25 μg/dose, about 1-25 μg/dose, 25-50 μg/dose, about 25-75 μg/dose, about 100-1,000 μg/dose, or about 100-500 μg/dose.

The immunomodulatory sterols can be administered to a variety of subjects, including humans, domestic animals such as dogs, cats, hamsters, guinea pigs, hedgehogs and the like, and livestock animals such as chickens, horses, cows, pigs, goats, sheep, deer, and exotic animals such as elephant, tiger, lions, zebra etc.

The immunomodulatory sterols disclosed herein can be used as an adjuvant with a variety of different antigens. "Antigen" refers to any substance that stimulates an immune response. The term includes killed, inactivated, attenuated, or modified live bacteria, viruses, or parasites. The term antigen also includes polynucleotides, polypeptides, recombinant proteins, synthetic peptides, protein extract, cells (including tumor cells), tissues, polysaccharides, or lipids, or fragments thereof, individually or in any combination thereof. The term antigen also includes antibodies, such as anti-idiotype antibodies or fragments thereof, and synthetic peptides.

In some instances, the antigen can provoke immunity to a helminth infection, for instance ascariasis, trichuriasis, hookworm, lymphatic filariasis, onchcocerciasis, dracunuliasis, schistosomiasis, a protozoan infection such as Chagas disease, African trypanosomiasis, leishmaniasis, or bacterial infections such as trachoma, leprosy and Buruli ulcer.

The antigen may include an attenuated or non-attenuated parasitic species. In some instances, the antigen may include one or more of *Eimeria* spp., *Eimeria* spp., *Eimeria maxima*, *Toxoplasma gondii*, *Neospora caninum* *Babesia canis*, *Babesia bovis* and *B. bigemina*, *Theileria parva*, *Theileria annulata*, *Giardia duodenalis*, *Leishmania infantum*, *Taenia ovis*, *Dictyocaulus viviparous*, or *Boophilus microplus*.

The antigen may include a composition derived from a virus such as from HIV-1, (such as tat, nef, gp120 or gp160), human herpes viruses, such as gD or derivatives thereof or Immediate Early protein such as ICP27 from HSV1 or HSV2, cytomegalovirus ((esp. Human) (such as gB or derivatives thereof), Rotavirus (including live-attenuated viruses), Epstein Barr virus (such as gp350 or derivatives thereof), Varicella Zoster Virus (such as gpI, II and IE63), or from a hepatitis virus such as hepatitis B virus (for example Hepatitis B Surface antigen or a derivative thereof), hepatitis A virus, hepatitis C virus and hepatitis E virus, or from other viral pathogens, such as paramyxoviruses: Respiratory Syncytial virus (such as F and G proteins or derivatives thereof), parainfluenza virus, measles virus, mumps virus, human papilloma viruses (for example HPV6, 11, 16, 18, etc.), flaviviruses (e.g., Yellow Fever Virus, Dengue Virus, Tick-borne encephalitis virus, Japanese Encephalitis Virus) or Influenza virus (whole live or inactivated virus, split influenza virus, grown in eggs or MDCK cells, or whole flu virosomes (as described by Gluck, Vaccine, 1992, 10, 915-920) or purified or recombinant proteins thereof, such as HA, NP, NA, or M proteins, or combinations thereof).

In some embodiments the antigen is an allergen preparation for specific allergen immunotherapy (allergen vaccination or sublingual immunotherapy). As used herein, the term "allergen", refers to a substance that can induce an allergic or asthmatic response in a susceptible subject, and includes but is not limited to pollens, insect venoms, animal dander, fungal spores and house dust mite.

In some further embodiments, a pharmaceutical composition of the invention may comprise a cancer antigen for eliciting a specific immune response against cancer cells expressing the antigen. As used herein, the terms "cancer antigen" and "tumor antigen" are interchangeable and they refer to a compound, such as a peptide, expressed by a cancer cell or a tumor cell and which is capable of provoking an immune response. More specifically, "tumor-specific antigens" are antigens that are specifically associated with tumor cells but not with normal cells. Non-limiting examples of tumor-specific antigens are those encoded by mutant cellular genes, such as oncogenes, suppressor genes, and fusion proteins resulting from internal deletions or chromosomal translocations. "Tumor-associated antigens" are present in both tumor cells and normal cells but are present in a different quantity or a different form in tumor cells. Still other cancer antigens are encoded by viral genes such as those carried on RNA and DNA viruses. The differential expression of cancer antigens in normal and cancer cells can be exploited in order to target cancer cells.

In some embodiments, cancers to be treated by the present methods, compounds, and compositions include, but are not limited to, carcinoma, lymphoma, blastoma, sarcoma, leukemia, squamous cell cancer, small-cell lung cancer, non-small cell lung cancer, adenocarcinoma of the lung, squamous carcinoma of the lung, cancer of the peritoneum, hepatocellular cancer, gastrointestinal cancer, gastric cancer, pancreatic cancer, neuroendocrine cancer, glioblastoma, cervical cancer, ovarian cancer, liver cancer, bladder cancer, brain cancer, hepatoma, breast cancer, colon cancer, colorectal cancer, endometrial or uterine carcinoma, esophageal cancer, salivary gland carcinoma, kidney cancer, liver cancer, prostate cancer, vulval cancer, thyroid cancer, head and neck cancer, and combinations thereof.

Cancer antigens specific for or associated with different cancers are well known in the art. Therefore, a skilled person art can easily select a cancer antigen to be comprised in a composition of the present invention depending on the cancer type to be treated. Cancer antigens can be prepared by methods well known in the art. For example, these antigens can be prepared from cancer cells either by preparing crude extracts of cancer cells, by partially purifying the antigens, by recombinant technology, or by de novo synthesis of known antigens. Further, the antigen may be a complete antigen, or it may be a fragment of a complete antigen comprising at least one epitope.

In certain embodiments, the antigen provoke an immune response to *Leishmania* spp. For instance, the antigen can include an attenuated strain of one or more *Leishmania* spp, such as *Leishmania major*, including live attenuated strains. In some cases, the attenuated strain can include a centrin gene deficient *Leishmania* spp. A centrin gene deficient *L. major* (LmCen$^{-/-}$) can be obtained using CRISPR-Cas9 technology. Other antigens include Mayrink's vaccine (*L. amazonensis*) and Convit's vaccine (*L. mexicana*+BCG). Fractionated *leishmania* antigens, for instance Fucose Mannose ligand antigen, soluble *L. donovani*, soluble exogenous antigens of *L. major*, or *L. donovani* promastigote soluble antigen, can also be advantageously employed. Others include surface expressed glycoprotein leishmaniolysis, leishmanial activated C kinase, parasite surface antigen, leishmanial-derived recombinant polyprotein (Leish-111f) and serine proteases. In some cases, the antigen can include chikungunya virus (CHIKV) strains, i.e., *Togaviridae alphavirus*. The strain can be live or inactivated, for instance inactivated 181/25 CHIKV.

The immunomodulatory sterols may be provided in a pharmaceutical composition that may be administered to a patient. For example, the composition may be in the form of a solid, liquid or gas (aerosol). Typical routes of administration include, without limitation, oral, topical, parenteral (e.g., sublingually or buccally), sublingual, rectal, vaginal, and intranasal. The term parenteral as used herein includes iontophoretic, sonophoretic, thermal, passive transdermal, microneedle administration and also subcutaneous injections, intravenous, intramuscular, intrasternal, intracavernous, intrathecal, intrameatal, intraurethral injection or infusion techniques. In a particular embodiment, a composition as described herein (including vaccine and pharmaceutical compositions) is administered intradermally by a technique selected from iontophoresis, microcavitation, sonophoresis or microneedles.

The pharmaceutical composition is formulated so as to allow the active ingredients contained therein to be bioavailable upon administration of the composition to a patient. Compositions that will be administered to a patient take the form of one or more dosage units, where for example, a tablet may be a single dosage unit, and a container of one or more compounds of the invention in aerosol form may hold a plurality of dosage units.

For oral administration, an excipient and/or binder may be present. Examples are sucrose, kaolin, glycerin, starch dextrins, sodium alginate, carboxymethylcellulose and ethyl cellulose. Coloring and/or flavoring agents may be present. A coating shell may be employed. The composition may be in the form of a liquid, e.g., an elixir, syrup, solution, emulsion or suspension. The liquid may be for oral administration or for delivery by injection, as two examples. When intended for oral administration, preferred compositions contain one or more of a sweetening agent, preservatives, dye/colorant and flavor enhancer. In a composition intended to be administered by injection, one or more of a surfactant, preservative, wetting agent, dispersing agent, suspending agent, buffer, stabilizer and isotonic agent may be included. A liquid pharmaceutical composition as used herein, whether in the form of a solution, suspension or other like form, may include one or more of the following carriers or excipients: sterile diluents such as water for injection, saline solution, preferably physiological saline, Ringer's solution, isotonic sodium chloride, fixed oils such as squalene, squalene, mineral oil, a mannide monooleate, cholesterol, and/or synthetic mono or digylcerides which may serve as the solvent or suspending medium, polyethylene glycols, glycerin, propylene glycol or other solvents; antibacterial agents such as benzyl alcohol or methyl paraben; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. The parenteral preparation can be enclosed in ampoules, disposable syringes or multiple dose vials made of glass or plastic. An injectable pharmaceutical composition is preferably sterile. In another embodiment, a composition of the invention is formulated in a manner which can be aerosolized.

While any suitable carrier known to those of ordinary skill in the art may be employed in the pharmaceutical compositions of this invention, the type of carrier will vary depending on the mode of administration and whether a sustained release is desired. For parenteral administration, such as subcutaneous injection, the carrier preferably comprises water, saline, alcohol, a fat, a wax or a buffer. For oral administration, any of the above carriers or a solid carrier, such as mannitol, lactose, starch, magnesium stearate, sodium saccharine, talcum, cellulose, glucose, sucrose, and magnesium carbonate, may be employed. Biodegradable microspheres (e.g., polylactic galactide) may also be employed as carriers for the pharmaceutical compositions of this invention. In this regard, it is preferable that the microsphere be larger than approximately 25 microns.

Pharmaceutical compositions (may also contain diluents such as buffers, antioxidants such as ascorbic acid, low molecular weight (less than about 10 residues) polypeptides, proteins, amino acids, carbohydrates including glucose, sucrose or dextrins, chelating agents such as EDTA, glutathione and other stabilizers and excipients. Neutral buffered saline or saline mixed with nonspecific serum albumin are exemplary appropriate diluents. Preferably, product may be formulated as a lyophilizate using appropriate excipient solutions (e.g., sucrose) as diluents.

The pharmaceutical composition may be intended for topical administration, in which case the carrier may suitably comprise a solution, emulsion, ointment or gel base. The base, for example, may comprise one or more of the following: petrolatum, lanolin, polyethylene glycols, beeswax, mineral oil, diluents such as water and alcohol, and emulsifiers and stabilizers. Thickening agents may be present in a pharmaceutical composition for topical administration. If intended for transdermal administration, the composition may include a transdermal patch or iontophoresis device. Topical formulations may contain a concentration of the antigen of from about 0.1 to about 10% w/v (weight per unit volume).

The composition may be intended for rectal administration, in the form, e.g., of a suppository which will melt in the rectum and release the drug. The composition for rectal administration may contain an oleaginous base as a suitable nonirritating excipient. Such bases include, without limitation, lanolin, cocoa butter and polyethylene glycol. In the methods of the invention, the vaccine compositions/adjuvants may be administered through use of insert(s), bead(s), timed-release formulation(s), patch(es) or fast-release formulation(s).

It may also be desirable to include other components in a vaccine or pharmaceutical composition, such as delivery vehicles including but not limited to aluminum salts, water-in-oil emulsions, biodegradable oil vehicles, oil-in-water emulsions, biodegradable microcapsules, and liposomes. Examples of additional immunostimulatory substances (co-adjuvants) for use in such vehicles are also described above and may include N-acetylmuramyl-L-alanine-D-isoglutamine (MDP), glucan, IL-12, GM-CSF, gamma interferon and IL-12.

The immunomodulatory sterols can be present in the pharmaceutical composition in an effective amount to induce a immunomodulatory response. In some embodiments, the composition can include about 0.01 µg/dose to about 5 mg/dose. In another specific embodiment, the composition can include about 0.1 µg/dose to about 1 mg/dose. In another specific embodiment, the the composition can include about 0.1 µg/dose to about 100 µg/dose. In another specific embodiment, the composition can include about 1 µg/dose to about 100 µg/dose. In another specific embodiment, the composition can include about 5 µg/dose to about 100 µg/dose. In another specific embodiment, the composition can include about 10 µg/dose to about 100 µg/dose. In another specific embodiment, the composition can include about 25 µg/dose to about 75 µg/dose. In another specific embodiment, the composition can include about 0.1 µg/dose to about 10 µg/dose.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Pentalinonsterol Synthesis. Pentalinonsterol (PEN) was synthesized from commercially available preg-5-en-3β-ol-20-one (pregnenolone), as previously described by Gupta et. al. (ACS Infect. Dis. 2015, 1, 497-506). All intermediates and the final product were purified using silica gel flash column chromatography, and were characterized by IR, $^1$H and $^{13}$C NMR, and HRMS.

Statistical Analysis. Data were determined as means±SEM. All statistical analyses were done by using Prism 5 software (GraphPad, La Jolla, CA, USA). The Student's unpaired t-test was used to determine the statistical significance of sample values, and p values less than 0.05 were considered statistically significant.

Macrophage Activation. RAW macrophages (RAW 264.7 (ATCC TIB-71), ATCC, Manassas, VA, USA) were plated at a concentration of $0.5 \times 10^6$ cells per well in 24-well plates, and treated with PEN (25 µM or 50 µM) or DMSO (vehicle control) for 24, 48 and 72 h. At the indicated times, cells were harvested for detection of MHC-II, CD40, CD80, CD86 surface expression by flow cytometry. RNA was also extracted from cells to determine gene expression of Tnfα, Il1b, Il6, IL10, Il15, Il18, Nos2, Arg1, and Chil3 by RT-PCR.

NF-κB and AP-1 Activity Assay. NF-kB and AP-1 activity was analyzed using the RAW-Blue NF-kB/AP1 reporter cell line (InvivoGen, San Diego, CA, USA), which contains a secreted embryonic alkaline phosphatase (SEAP) reporter construct, inducible by NF-κB and AP-1. Cells were cultured in RPMI 1640 medium supplemented with 10% FBS (Atlanta Biologicals, Flowery Branch, GA, USA) and 1% penicillin streptomycin (Life Technologies, Carlsbad, CA, USA), and stimulated with 25 µM PEN or DMSO (vehicle control) for 24 h. Culture supernatants were then collected and alkaline phosphatase activity was determined by incubating with the detection medium QUANTI-Blue (InvivoGen), and measuring at 655 nm using a SpectraMax spectrophotometer (Molecular Devices LLC, Sunnyvale CA, USA) and analyzed using Softmax Pro software (Molecular Devices LLC).

Figure 2A:
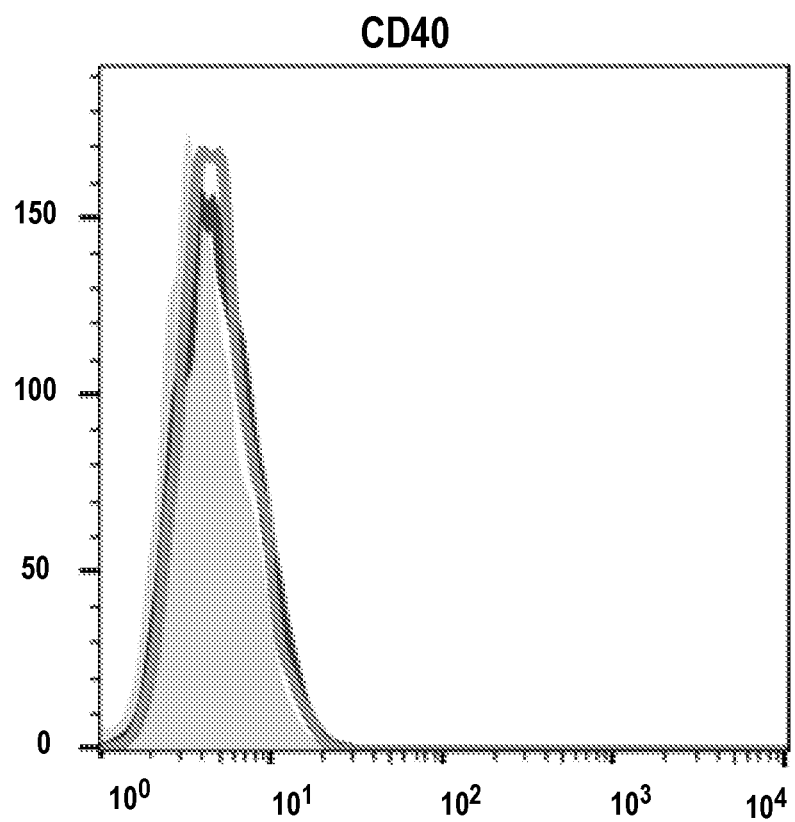
FIGS. 2A-2H depict enhanced expression of CD40, MHC-II, CD80 and CD86 by administration of exemplary compounds to RAW macrophages.
Figure 2B:
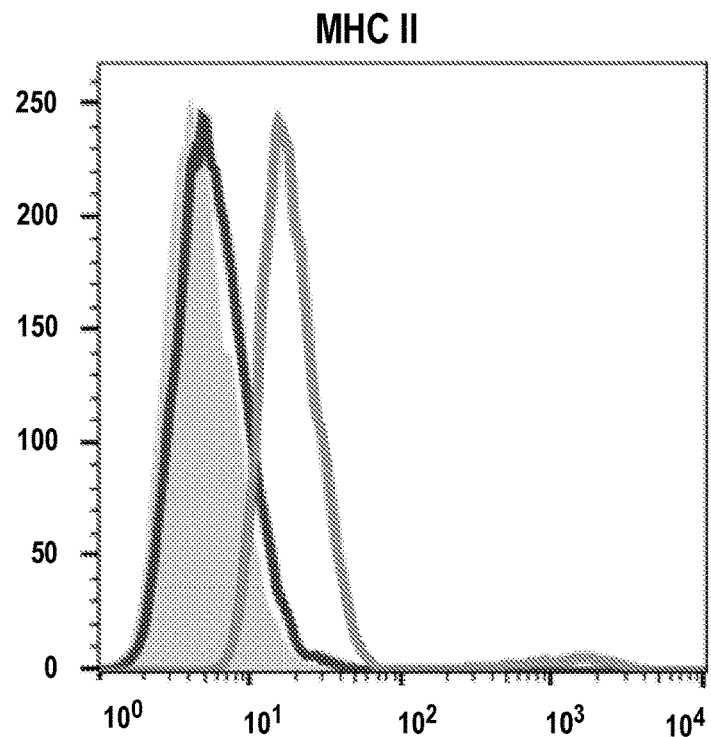
Figure 2C:
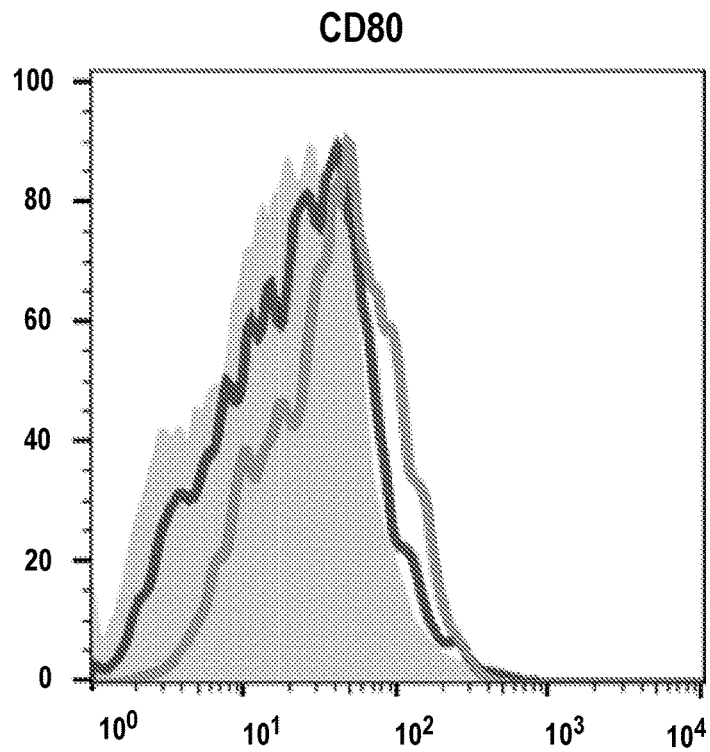
Figure 2D:
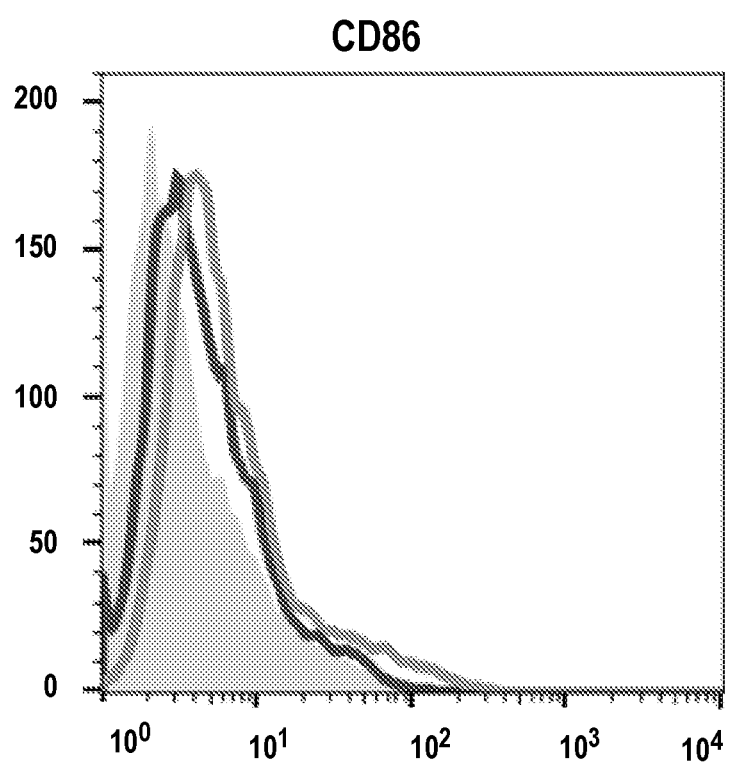
Figures 2E, 2F:
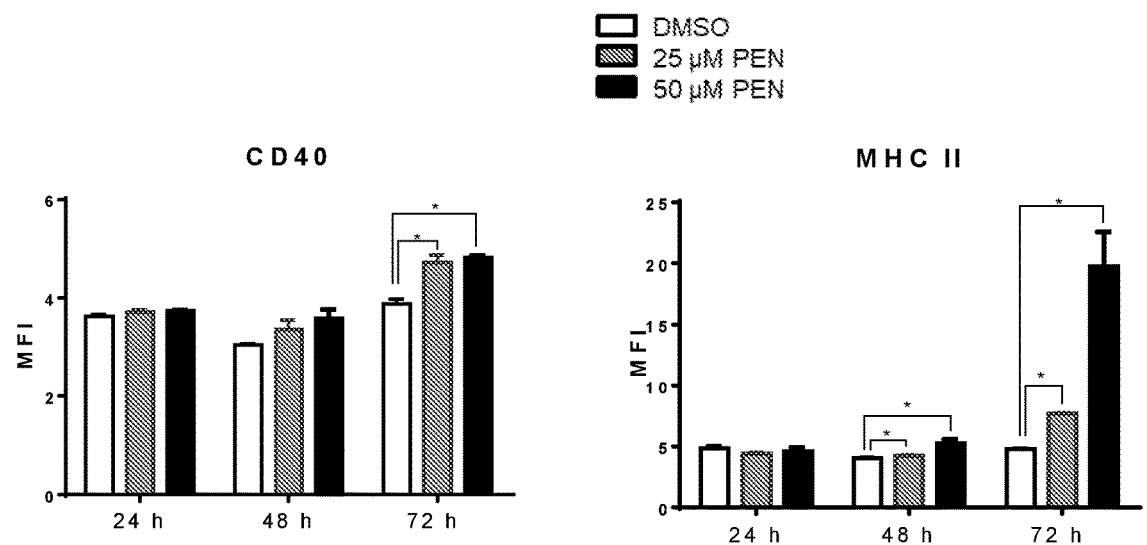
Figures 2G, 2H:
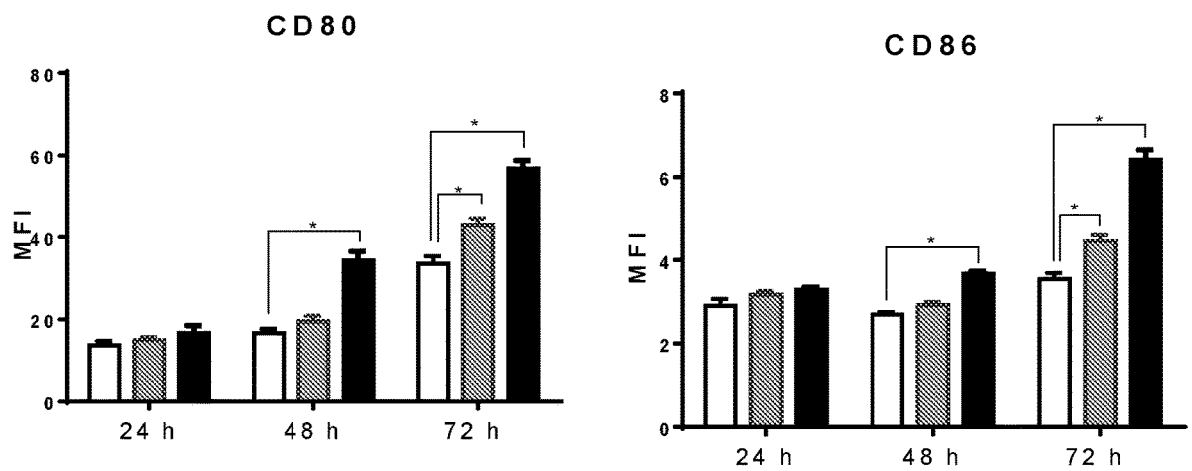

Stimulation by PEN resulted in significantly increased alkaline phosphatase activity in RAW-Blue cells when compared to cells treated with vehicle alone (FIG. 1). RAW macrophages were treated with 25 µM or 50 µM PEN and analyzed for CD40, CD80, CD86 and MHC-II expression by flow cytometry. It was observed that PEN (at 25 µM and 50 µM) significantly enhanced the expression of CD40 after 72 h (FIGS. 2A and 2E) and MHC-II at 48 h and 72 h (FIGS. 2B and 2F). Expression of CD80 and CD86 was increased by 50 µM PEN at 48 h and by both concentrations of PEN at 72 h (FIGS. 2C, 2D, 2F, and 2G). These results demonstrated that PEN enhances macrophage activation and potentiates its antigen-presenting capabilities.

Figures 3A, 3B:
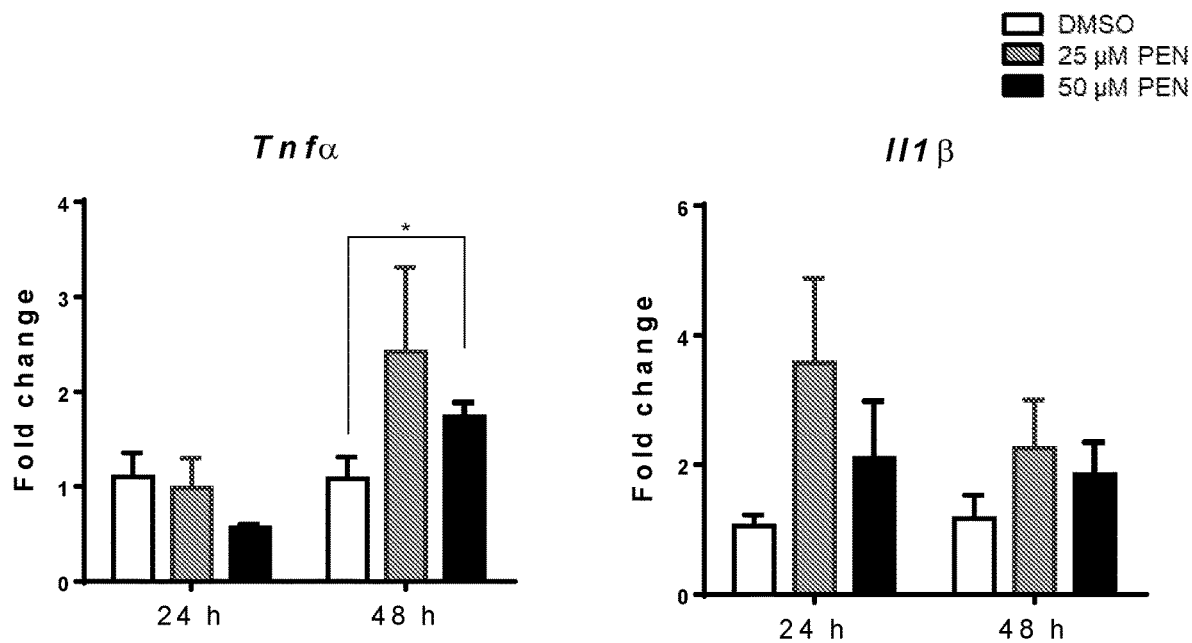
FIGS. 3A-3I depict enhanced mRNA levels of TNF-α and IL-6, as well as increased gene transcript levels of NOS-2, IL-15 and IL-18, by administration of exemplary compounds to RAW macrophages.
Figures 3C, 3D:
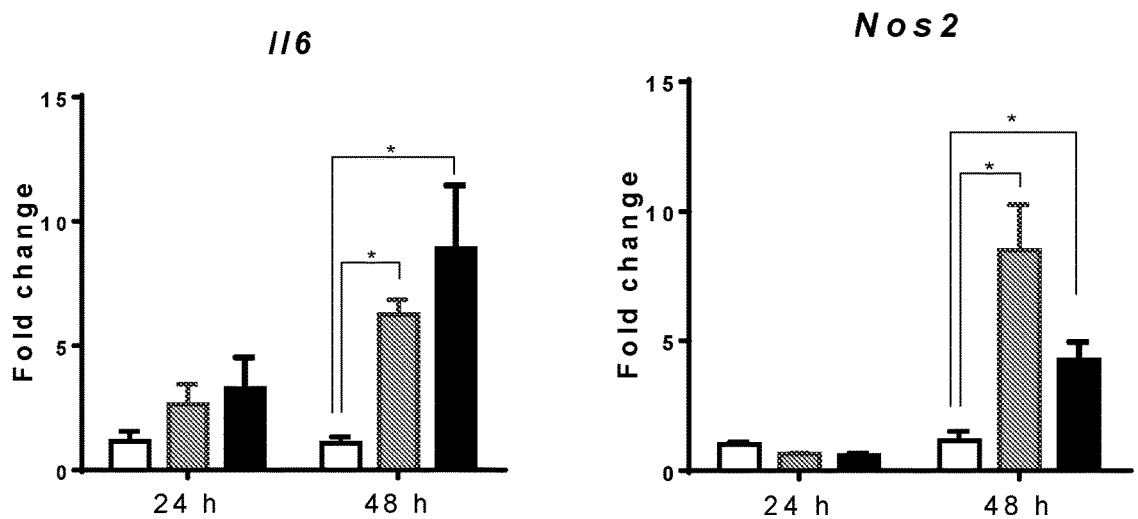

The expression of MHC-II and the co-stimulatory molecules CD80 and CD86 on antigen-presenting cells (APCs) is critical for subsequent T cell activation.14,15 Furthermore, CD40 expressed on macrophages binds to its ligand (CD40L) on activated T cells, leading to macrophage activation, expression of pro-inflammatory cytokines such as TNF-α, IL-1 and IL-6, and release of reactive oxygen species and nitric oxide. These pro-inflammatory activities are also linked to NF-κB activation. Since increased NF-κB activity was observed in PEN-stimulated macrophages, therefore the gene expression of pro-inflammatory mediators after PEN stimulation of these cells was analyzed. The results obtained indicate that both PEN stimulation increases the mRNA levels of Tnfα and Il6 at 48 h (FIGS. 3A and 3C). Also observed was an increased trend of Il 1b gene expression at 24 and 48 h although this increase was not statistically significant (FIG. 3B).

Next, it was determined whether or not activation of macrophages by PEN resulted in a specific polarization pattern characteristic of classical or alternative activation.

Figure 3E:
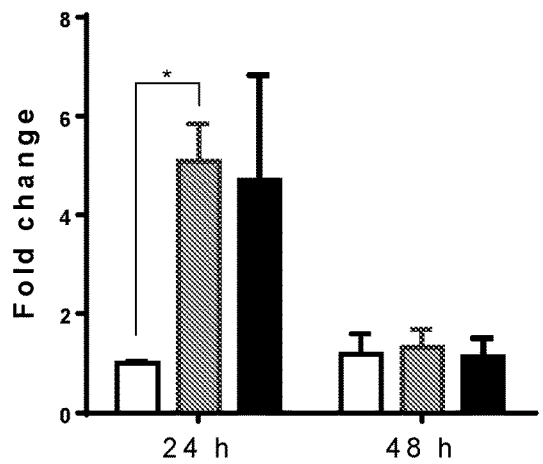
Figure 3F:
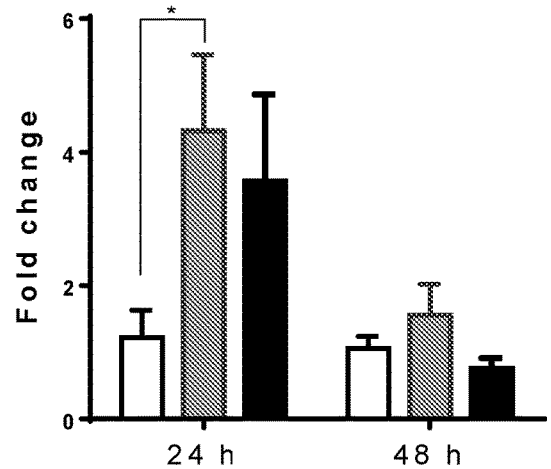
Figure 3G:
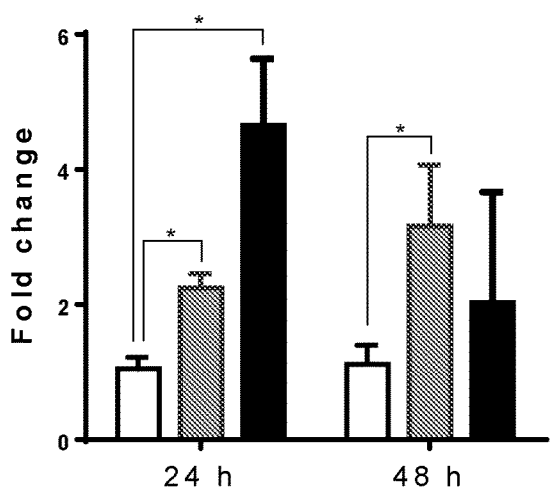
Figure 3H:
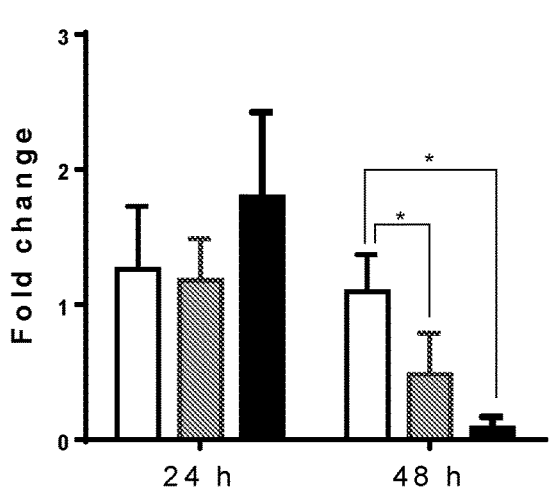
Figure 3I:
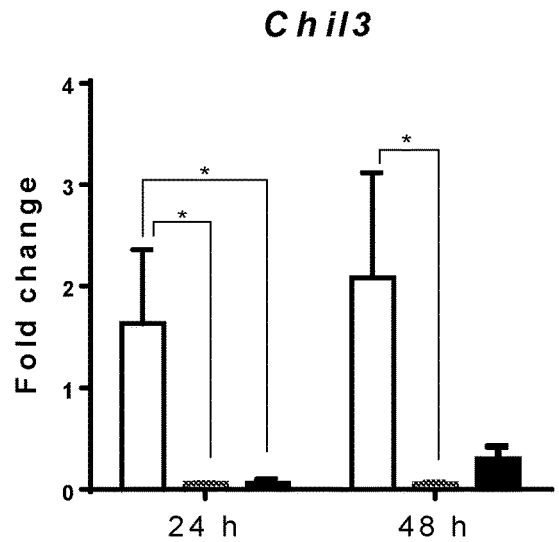

Depending on the signaling pathway of activation as well as the surrounding cytokine microenvironment, activation of macrophages can result in distinct phenotypes known as classically activated (M1) macrophages or alternatively activated (M2) macrophages.17-19 M1 macrophages are pro-inflammatory and their activation is induced by IFN-γ, TNF-α, LPS, and other TLR ligands. M1 macrophages display their effector functions by expressing enzymes such as Nos2, as well as cytokines such as TNF-α, IL-1, IL-15, and IL-18. RAW macrophage stimulation by PEN resulted in significantly increased gene transcript levels of Nos2 after 48 h (FIG. 3D) while IL-15 and IL-18 gene transcripts were increased by 25 µM PEN after 24 h of stimulation (FIGS. 3E and 3F). It appears from these data that activation of RAW macrophages by PEN promotes the M1 macrophage polarization. M2 macrophages are anti-inflammatory and are characterized by high Arg1 and IL-10 production. Chitinase-like 3 protein (Chil3), is also produced by M2 macrophages. While increased transcript levels of Arg1 were observed, levels of IL-10 (at 48 h) and Chil3 (at 24 h and 48 h were significantly reduced in RAW macrophages stimulated with PEN. This differential regulation of M2 associated gene expression profiles reflects the heterogeneity that exists within the M2 macrophage populations.

Isolation of Mouse Bone Marrow-derived Dendritic Cells. Bone marrow-derived dendritic cells (BMDCs) were prepared by harvesting bone marrow cells from the femurs and tibias of C57BL/6 mice. Red blood cell lysis was performed in ACK lysis buffer, and subsequent cells were plated in RPMI medium supplemented with 10% FBS, 1% penicillin-streptomycin (Life Technologies) and 20 ng/mL GM-CSF (Peprotech, Rocky Hill, NJ, USA) at 5 million cells/dish for 6 to 8 days. Cells were harvested then stimulated with PEN (25 µM or 50 µM) or DMSO for 24 h, and culture supernatants were collected for detection of IL-12 and IL-10 cytokines by ELISA.

T Cell Co-culture Experiments $5 \times 10^4$ BMDCs were pulsed with 10 µg/mL OVA$_{323-339}$ peptide (Anaspec, Fremont, CA, USA) for 2 h, then incubated with PEN (25 µM or 50 µM) or DMSO (vehicle control) for 24 h. CFSE labeled T cells isolated from spleens of OT-II transgenic mice were added to the wells at a 1:4 (BMDC:T cell) ratio and incubated for 72 h. Antigen-specific T cell proliferation was analyzed by flow cytometry of CFSE stained cells. Cell co-culture supernatants were collected for analysis of IFN-γ cytokine production by ELISA.

Figure 4A:
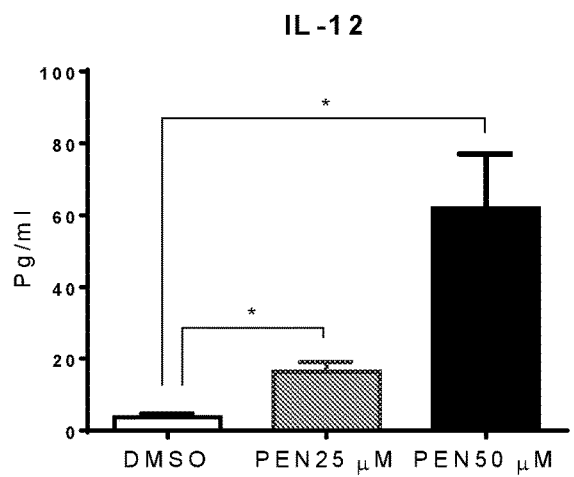
FIGS. 4A-4D depict increased production of IL-12, IL-10, and IFN-γ, by administration of exemplary compounds to bone marrow-derived dendritic cells, as well as increased proliferation of T-cells co-cultured with bone marrow-derived dendritic cells treated with exemplary compounds.
Figure 4B:
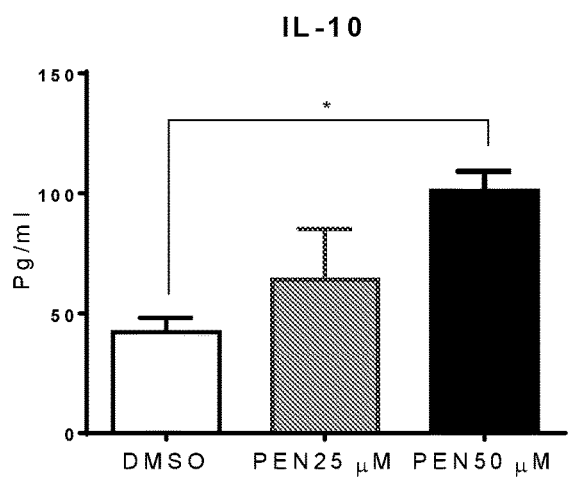

The results showed that PEN significantly induces the production of IL-12 in BMDCs (FIG. 4A). Also observed was a slight increase in IL-10 production by BMDCs stimulated with 50 µM PEN (FIG. 4B), although this increase was not nearly as robust as PEN mediated IL-12 production. Taken together, the results obtained in this investigation demonstrate that PEN is a potent activator of BMDCs in vitro.

Figure 4C:
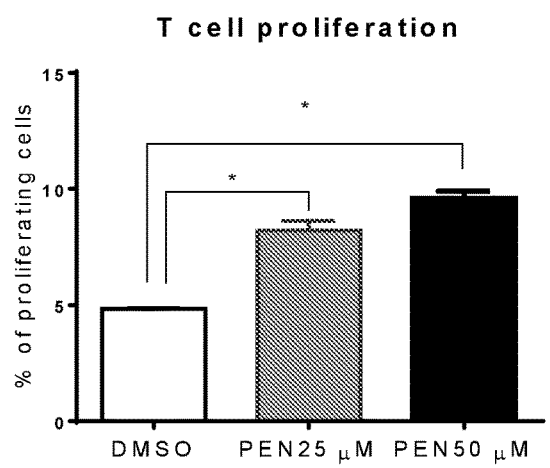
Figure 4D:
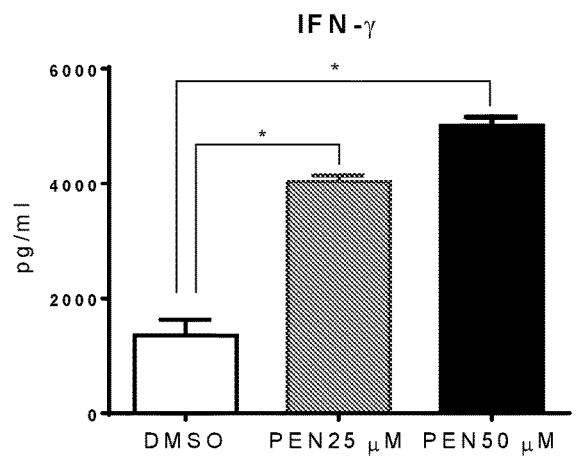
Figure 5:
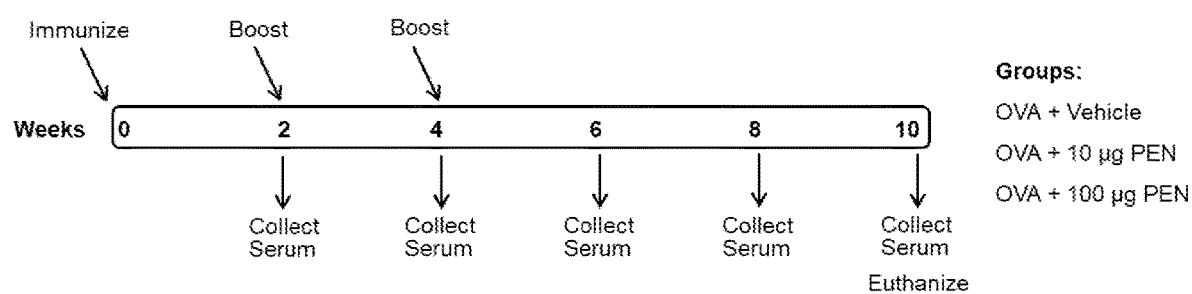
FIG. 5 depict an experimental design to assess the immunomodulatory effects of exemplary compounds.

OVA transgenic OTII T cells were incubated with OVA-peptide-loaded BMDCs that were stimulated with 25 µM PEN, 50 µM PEN or DMSO (vehicle control). T cell proliferation and cytokine production (IFN-γ) were analyzed after 72 h of BMDC:T cell co-culture. The data afforded demonstrated that T cells co-cultured with PEN-treated BMDCs displayed higher proliferation rates compared to T cells co-cultured with DMSO control-treated BMDCs (FIG. 4C). Further, PEN-treated BMDCs significantly increased the production of IFN-γ by T cells compared to BMDCs treated with the DMSO control (FIG. 4D). In both cases, T cell responses were greater in BMDCs treated with 50 µM PEN compared to 25 µM PEN. The results demonstrated that PEN activates BMDCs in a manner that polarizes T cells towards a Th1 immune response.

Mouse Immunization Studies. Six- to seven-week-old female BALB/c mice were purchased from Harlan Laboratories (Indianapolis, IN, USA). Mice were randomized into three groups, and immunized subcutaneously with 100 µg OVA (endotoxin free; BioVendor, Ashville, NC, USA) plus vehicle (Group 1), 100 µg OVA plus 10 µg PEN (Group 2), or 100 µg OVA plus 100 µg PEN (group 3, PEN1000). Each group received respective boosting doses of treatment at weeks 2 and 4. Serum was collected from each mouse at every two weeks after initial immunization for detection of IgG1 and IgG2A antibodies by ELISA. Mice were euthanized at week 10 and spleens and lymph nodes were harvested for detection of cytokines IFN-γ, IL-4, IL-10 and IL-13 by ELISA after re-stimulation with 1 mg/mL OVA antigen for 72 h.

Cytokine ELISA. Purified anti-mouse antibodies against IFN-γ, IL-4, IL-10, IL-12 (Biolegend, San Diego, CA, USA) and IL-13 (eBiosciences, San Diego, CA, USA) were used to coat plates. Recombinant mouse IFN-γ, IL-4, IL-10, IL-12 and IL-13 (BD Biosciences, San Jose, CA, USA) were used as standards. Biotinylated anti-mouse antibodies for IFN-γ, IL-4, IL-10, IL-12 and IL-13 (Biolegend, San Diego, CA) were used as detection antibodies. AKP-streptavidin (BD Biosciences) and p-nitrophenylphosphate (PNPP, Thermo Fisher Scientific, Waltham, MA, USA) were used for detection. Absorbance was measured at 405 nm using a Spectramax microplate reader and data were analyzed by Softmax Pro software (Molecular Devices LLC, Sunnyvale, CA).

Antibody ELISA. Mice were bled at weeks 2, 4, 6, 8 and 10 after immunization and serum was collected from the blood samples. IgG1 and IgG2a antibody titers were determined by ELISA using HRP-conjugated antibodies (Biolegend) and TMB substrate (KPL, Inc., Gaithersburg, MD, USA). Absorbance was measured at 450 nm by Spectramax microplate reader and data were analyzed by Softmax Pro software (Molecular Devices LLC).

Real Time PCR. Total RNA was extracted from RAW macrophages using TRIzol reagent (Life Technologies). RNA was reverse-transcribed to cDNAs using an iScript reverse transcriptase kit (Bio-Rad, Hercules, CA, USA). Real-time PCR reactions using the IQ SYBR Green mix reagent were performed in a CFX96 RT-PCR cycler (Bio-Rad). Primer sequences for Tnfa, Illb, 116, IL10, 1115, 1118, Nos2, Arg1 and Chil3 were selected from the Primer Bank database (pga.mgh.harvard.edu/primerbank). Data were normalized to the reference gene β-actin and presented as fold induction over controls.

Flow Cytometry. Macrophages treated with PEN or the DMSO control were harvested, washed in PBS, blocked with normal mouse serum, and incubated with fluorochrome conjugated antibodies against the cell surface markers CD40, CD80, CD86 and MHC-II (Biolegend). Cells were acquired on a BD FACS Calibur (BD Biosciences) and analysis was performed using FlowJo software (Tree Star Inc, Ashland, OR, USA).

Figure 6A:
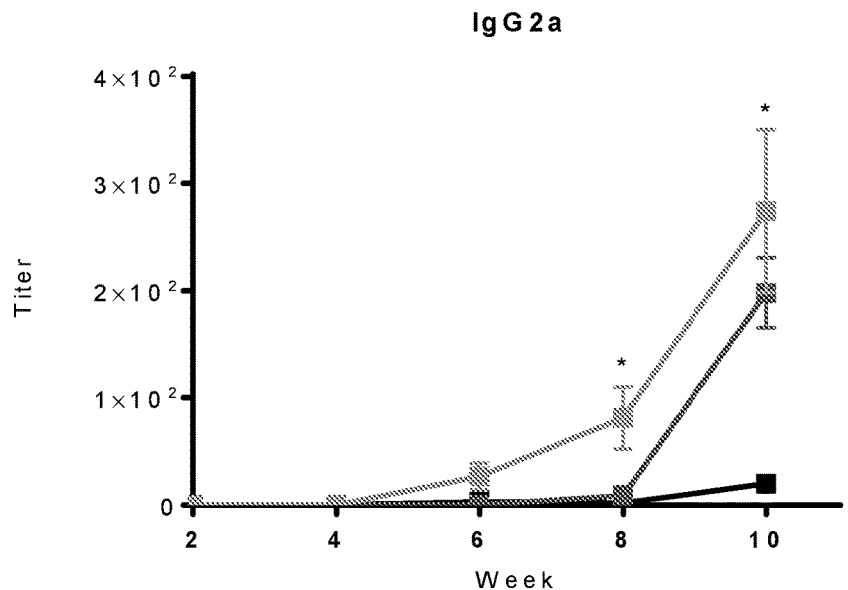
FIGS. 6A-6B depict increased IgG1 and IgG2 antibody titers upon administration of exemplary compounds.
Figure 6B:
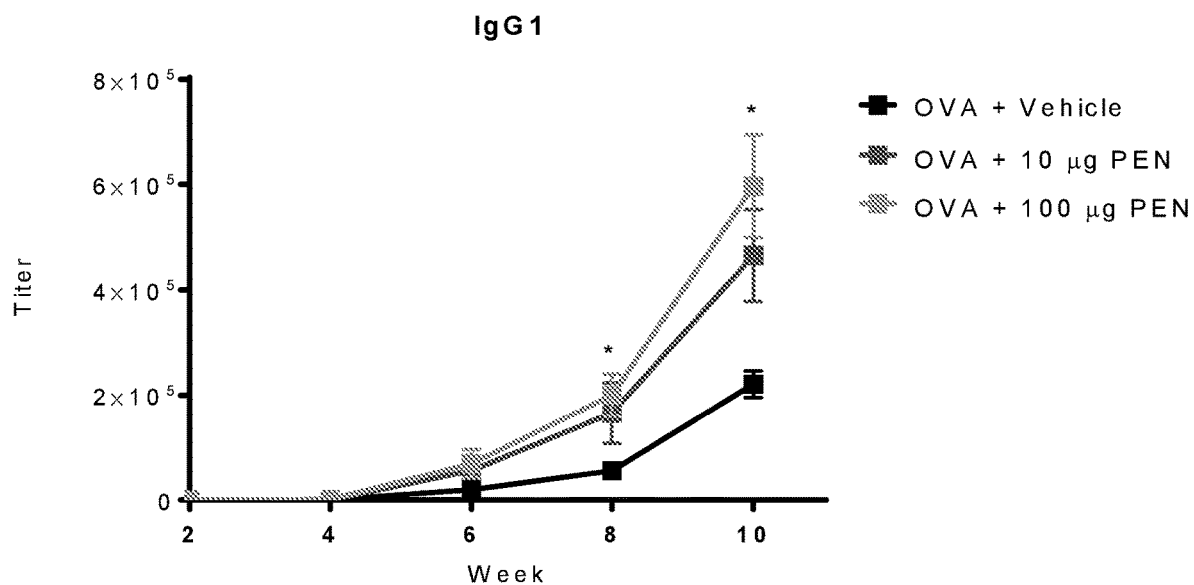

Administration of 10 µg and 100 µg PEN significantly increased IgG1 and IgG2a antibody titers when compared to vehicle controls (FIG. 6). Levels of IgG1 and IgG2a antibody subtypes in the serum of immunized mice are reflective of Th2 and Th1 immune responses, respectively. Therefore, the data obtained suggest that immunization with PEN as an adjuvant is capable of enhancing both Th1 and Th2 immune responses in vivo.

Figure 7A:
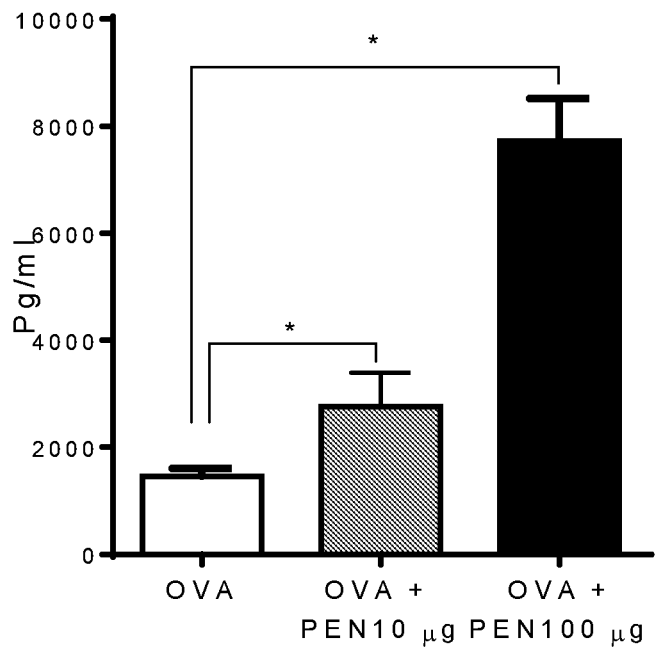
FIGS. 7A-7H depicts significantly increased levels of IFN-γ in both lymph node cells and splenocytes upon antigen re-stimulation, increased levels of the Th2 associated cytokines IL-4 and IL-13 produced in culture supernatants of lymph node and splenic cells. Levels of IL-10 were generally comparable in culture supernatants of lymph nodes and spleens between mice immunized with pentalinonsterol ("PEN") and vehicle control.
Figure 7B:
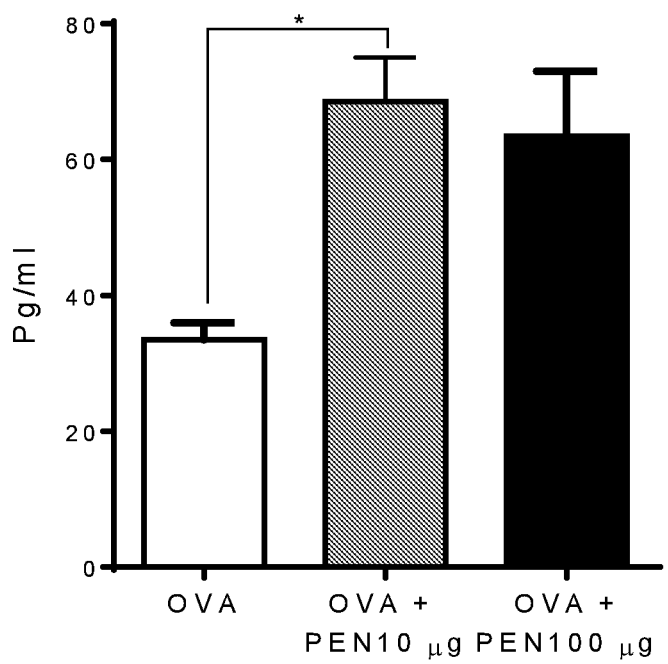
Figure 7C:
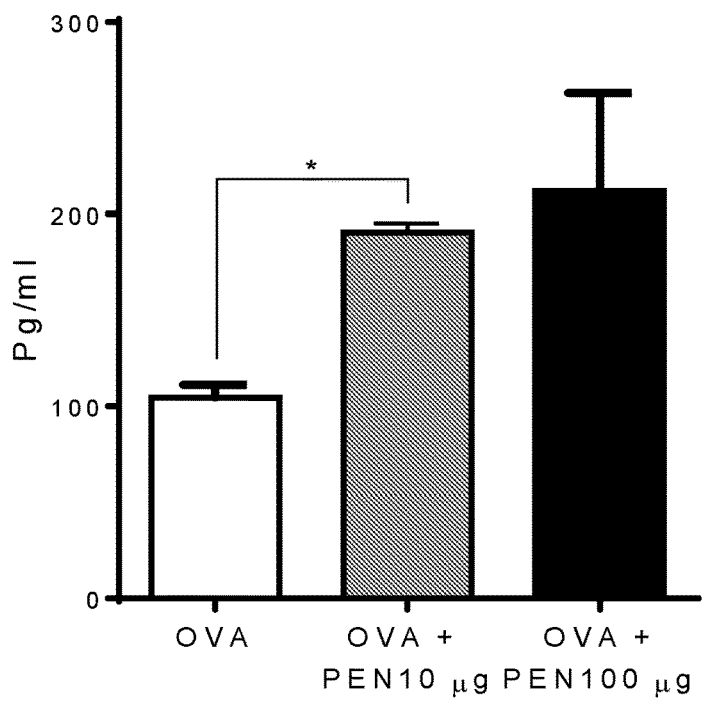
Figure 7D:
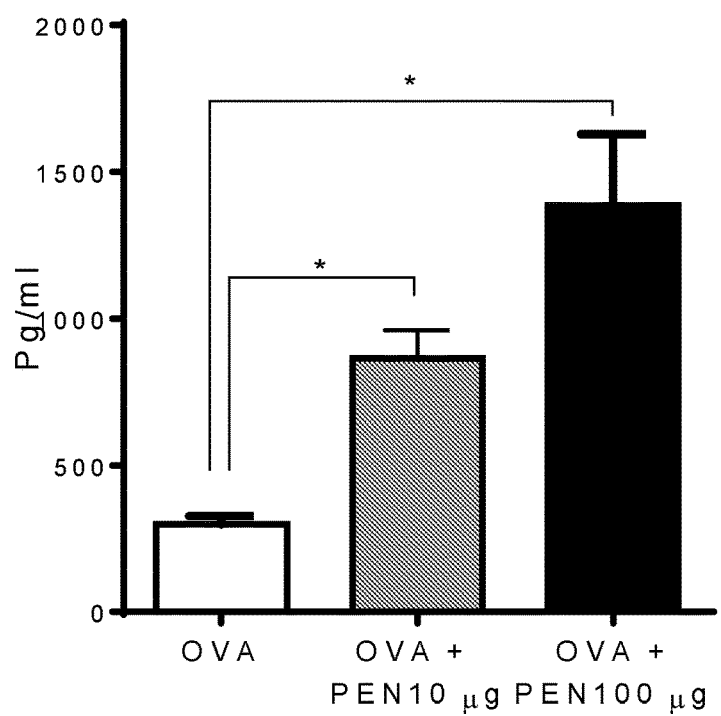
Figure 7E:
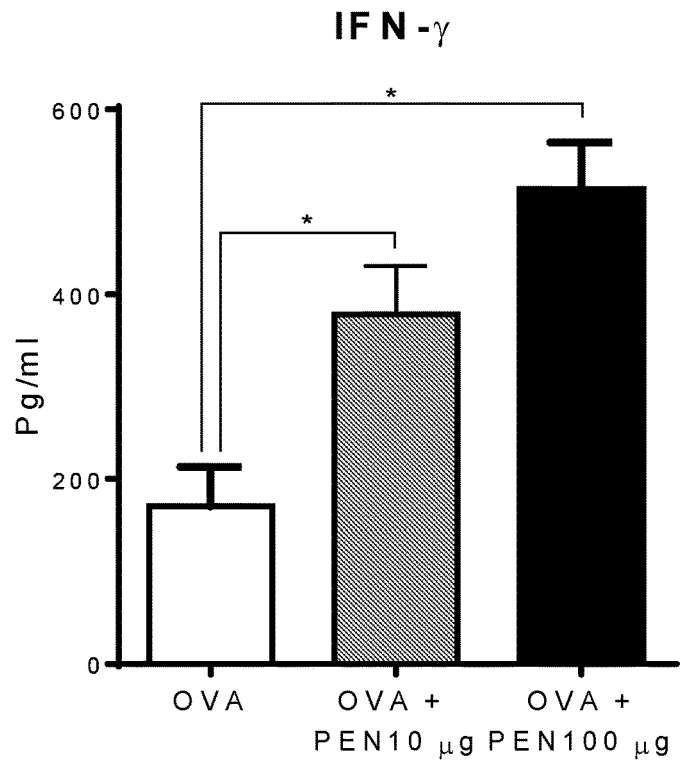
Figure 7F:
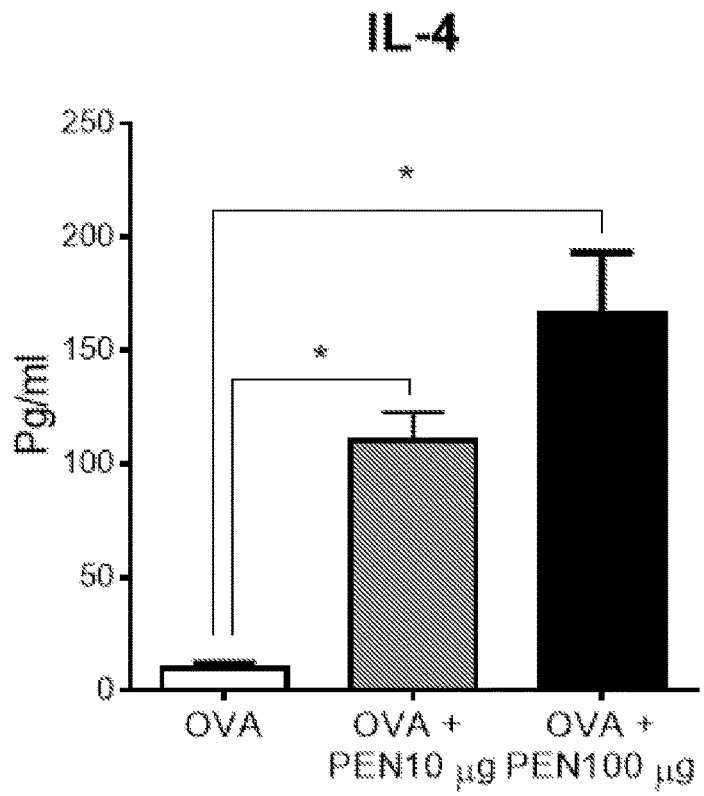
Figure 7G:
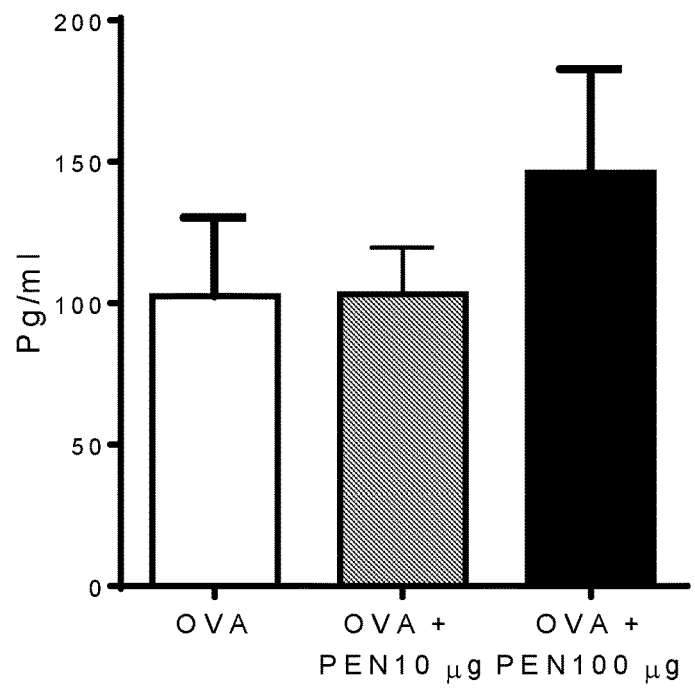
Figure 7H:
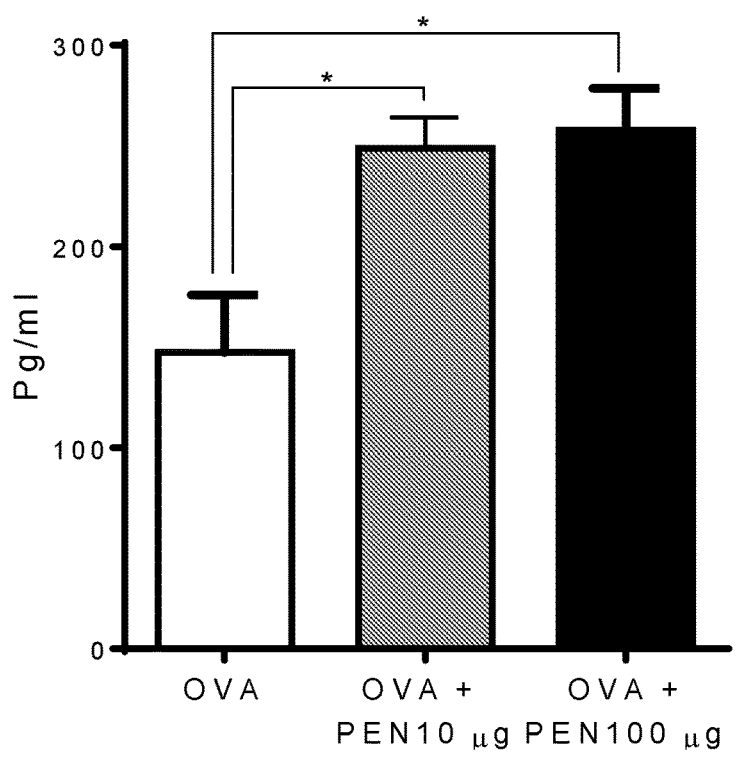

The nature of the adaptive immune responses generated in the spleen and draining lymph nodes of OVA immunized mice were further analyzed using PEN as adjuvant. Single cell suspensions from these tissues were re-stimulated with OVA antigen ex vivo and cytokine production was measured in culture supernatants. The results indicated that OVA plus PEN immunization led to significantly increased levels of IFN-γ in both lymph node cells and splenocytes upon antigen re-stimulation (FIGS. 7A and 7E). Interestingly, also observed were increased levels of the Th2 associated cytokines IL-4 (FIGS. 7B and 7F) and IL-13 (FIGS. 7D and 7H) produced in culture supernatants of lymph node and splenic cells. Levels of IL-10 were generally comparable in culture supernatants of lymph nodes and spleens between mice immunized with PEN and vehicle control (FIGS. 7C and 7G). Taken together, these data confirmed that PEN immunization leads to increased Th1 and Th2 immune responses in vivo.

The results from the current in vitro and in vivo analyses of the immunomodulatory properties of PEN suggest a consistent ability to induce Th1 immune responses characterized by the production of IFN-γ. This is of great interest in the design of vaccine adjuvants that require this arm of the immune response for protection, such as intracellular pathogens. This explains why a liposomal formulation of PEN was protective against infection by *L. donovani*. It is noteworthy that Th2 responses were also elicited by OVA immunization with PEN compared to OVA with vehicle. This is not surprising as previous studies have demonstrated that some FDA-approved adjuvants like poly lactic-co-glycolic acid (PLGA) and *quillaja* saponin (from the bark of *Quillaja saponaria* Molina; Quillajaceae) are able to elicit both Th1 and Th2 immune responses and they have been used in many veterinary vaccine formulations. Adjuvants that enhance both Th1- and Th2-based immune responses are ideal candidates for vaccine development against several pathogens.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A pharmaceutical composition comprising an immunomodulatory sterol having the following structure:

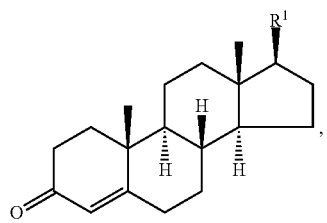

wherein
R$^1$ is selected from C$_1$-C$_{12}$ alkyl and C$_1$-C$_{12}$ alkenyl, and an antigen, wherein the antigen comprises killed, inactivated, attenuated, or modified live bacteria, viruses, or parasites,
wherein the immunomodulatory sterol is present in an amount from 0.1 to 100 µg.

2. The pharmaceutical composition according to claim 1, wherein R$^1$ is selected from:

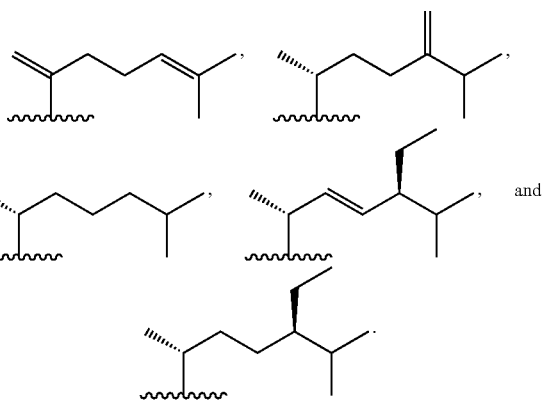

3. The pharmaceutical composition according to claim 1, wherein the immunomodulatory sterol has the formula:

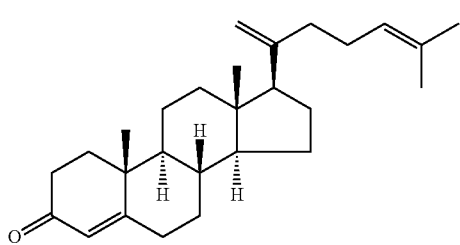

4. The pharmaceutical composition according to claim 1, wherein the antigen provokes an immune response to *Leishmania* spp.

5. The pharmaceutical composition according to claim 1, wherein the antigen comprises an attenuated strain of *Leishmania* spp.

6. The pharmaceutical composition according to claim 1, wherein the antigen comprises LmCen$^{-/-}$, Mayrink's vaccine, Convit's vaccine, soluble *L. donovani*, soluble exogenous antigens of *L. major*, or *L. donovani* promastigote soluble antigen.

7. The pharmaceutical composition according to claim 1, wherein the immunomodulatory sterol is present in an amount from about 1-25 μg.

8. A method for vaccinating a subject in need thereof, comprising administering to the subject the composition according to claim 1.

9. The method according to claim 8, wherein R$^1$ is selected from:

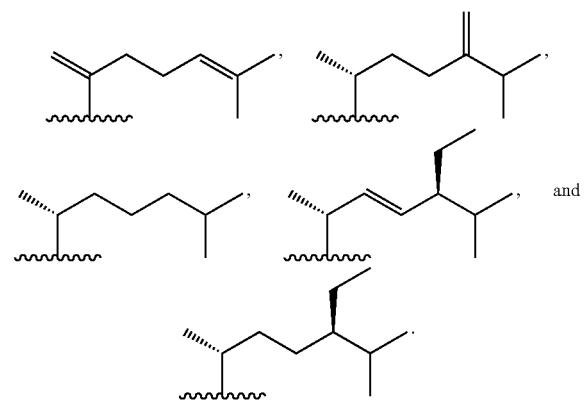

10. The method according to claim 8, wherein the immunomodulatory sterol has the formula:

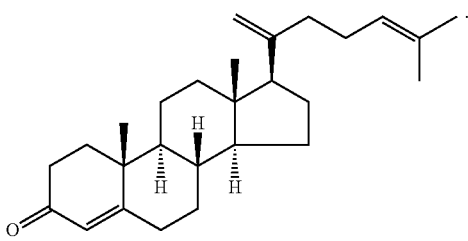

11. The method according to claim 8, wherein the antigen provokes an immune response to *Leishmania* spp.

12. The method according to claim 8, wherein the antigen comprises an attenuated strain of *Leishmania* spp.

13. The method according to claim 8, wherein the antigen comprises LmCen$^{-/-}$, Mayrink's vaccine, Convit's vaccine, soluble *L. donovani*, soluble exogenous antigens of *L. major*, or *L. donovani* promastigote soluble antigen.

14. The method according to claim 8, wherein the immunomodulatory sterol is administered in an amount from about 1-25 μg.

15. The method according to claim 8, wherein the immunomodulatory sterol and antigen are administered in a single composition.

16. The method according to claim 8, wherein the immunomodulatory sterol and antigen are administered in separate compositions.

* * * * *